(12) United States Patent
Mukhopadhyay et al.

(10) Patent No.: US 11,050,681 B2
(45) Date of Patent: Jun. 29, 2021

(54) FAST ROUTING CONVERGENCE FOR BORDER GATEWAY PROTOCL (BGP) SYSTEMS INCLUDING ONE OR MORE ROUTE REFLECTORS (RRS)

(71) Applicant: Juniper Networks, Inc., Sunnyvale, CA (US)

(72) Inventors: Nirmalya Mukhopadhyay, Sunnyvale, CA (US); Nischal Singh, Ottawa (CA); John G. Scudder, Ann Arbor, MI (US); Rahul Unnikrishnan, Herndon, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 42 days.

(21) Appl. No.: 16/555,836

(22) Filed: Aug. 29, 2019

(65) Prior Publication Data
US 2021/0067463 A1     Mar. 4, 2021

(51) Int. Cl.
| H04L 12/947 | (2013.01) |
| H04L 12/717 | (2013.01) |
| H04L 12/759 | (2013.01) |
| H04L 12/707 | (2013.01) |
| H04L 12/701 | (2013.01) |
| H04L 12/751 | (2013.01) |
| H04L 12/715 | (2013.01) |

(52) U.S. Cl.
CPC .......... H04L 49/251 (2013.01); H04L 45/028 (2013.01); H04L 45/42 (2013.01); *H04L 45/00* (2013.01); *H04L 45/02* (2013.01); *H04L 45/04* (2013.01); *H04L 45/22* (2013.01)

(58) Field of Classification Search
CPC ..... H04L 49/251; H04L 45/028; H04L 45/42; H04L 45/02; H04L 45/04; H04L 45/22; H04L 45/00
See application file for complete search history.

(56) References Cited

U.S. PATENT DOCUMENTS

| 7,647,426 B2* | 1/2010 | Patel ................. H04L 45/22 709/239 |
| 9,794,166 B2* | 10/2017 | Papadimitriou ........ H04L 45/02 |
| 10,541,905 B2* | 1/2020 | Patel ................. H04L 45/42 |

(Continued)

*Primary Examiner* — Brian T O Connor
(74) *Attorney, Agent, or Firm* — John C. Pokotylo; Pokotylo Patent Services

(57) ABSTRACT

Responsive to receiving the BGP UPDATE message, a route reflector may (1) update a CLUSTER_LIST value and, if needed, an ORIGINATOR_ID value, in a path attribute section in the BGP UPDATE message to generate a revised BGP UPDATE message, and (2) send the revised BGP UPDATE message to a client of the route reflector, regardless of whether or not one of (A) field validity checking of the BGP UPDATE message, (B) Adj-RIBS-In update using the BGP UPDATE message, (C) decision processing for route selection using information in the BGP UPDATE message, or (D) Adj-RIBS-Out update using the BGP UPDATE message, is completed (or perhaps even started). This provides faster route propagation and avoids delays associated with processing BGP UPDATE messages (NLRI with advertisements and withdrawals) at each hop the NLRIs using conventional BGP such as next-hop validation, best path selection, etc.

20 Claims, 14 Drawing Sheets

(56) References Cited

U.S. PATENT DOCUMENTS

| | | | | |
|---|---|---|---|---|
| 2012/0254465 A1* | 10/2012 | Papadimitriou | ........ | H04L 45/14 |
| | | | | 709/242 |
| 2013/0121340 A1* | 5/2013 | Papadimitriou | ........ | H04L 45/02 |
| | | | | 370/410 |
| 2015/0312055 A1* | 10/2015 | Varga | .................. | H04L 12/4633 |
| | | | | 370/254 |
| 2016/0248658 A1* | 8/2016 | Patel | ..................... | H04L 45/127 |
| 2018/0109450 A1* | 4/2018 | Filsfils | .................... | H04L 45/74 |

* cited by examiner

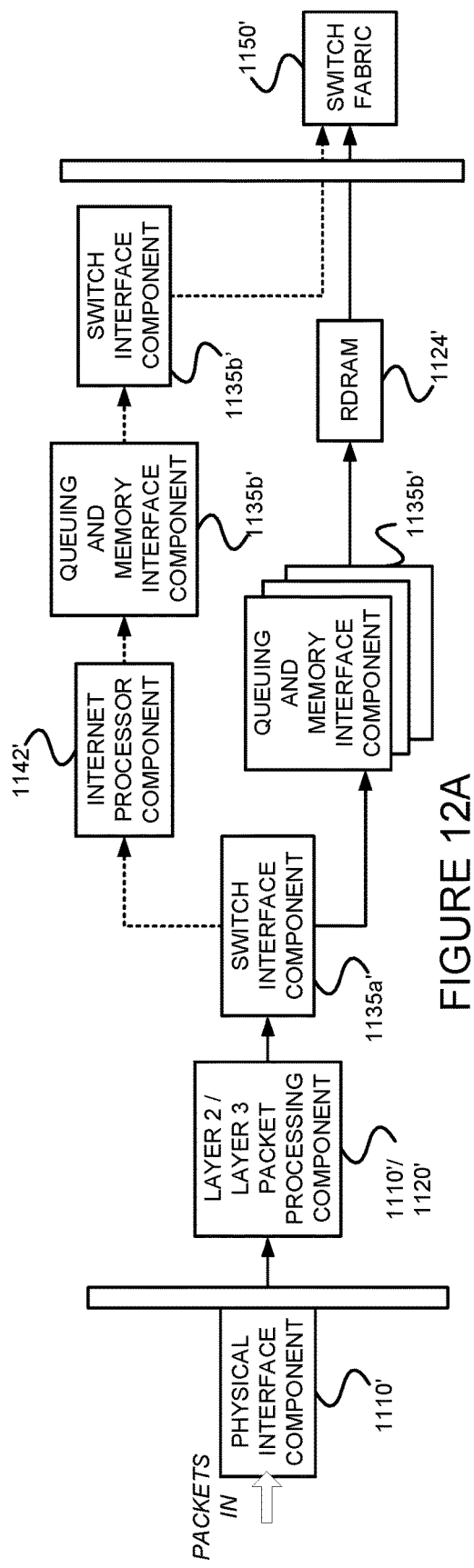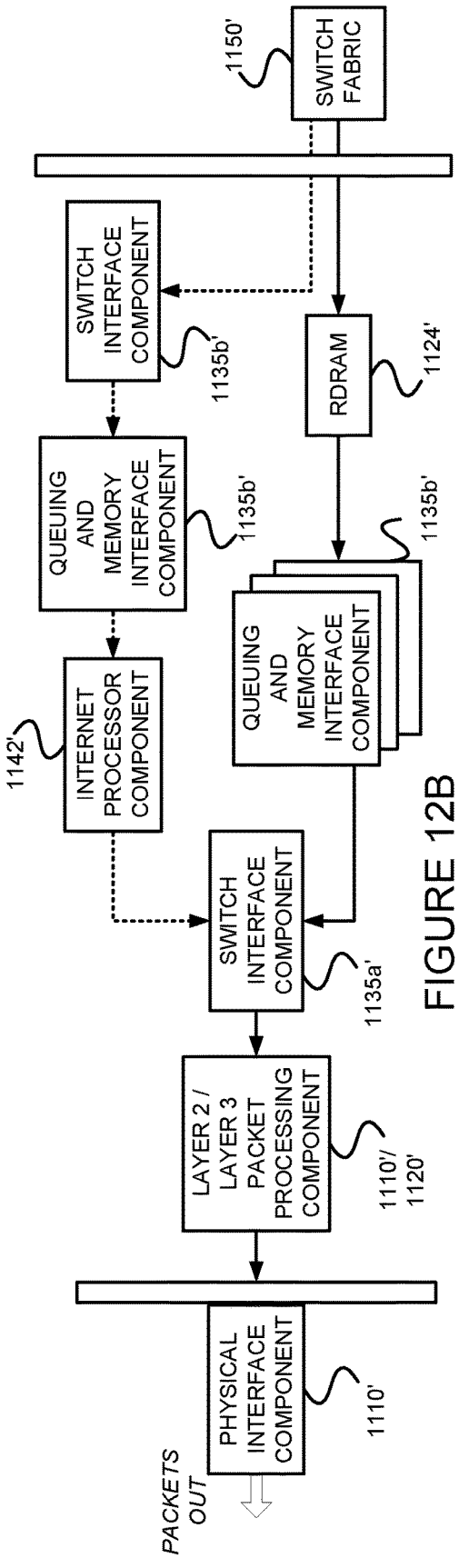

FAST ROUTING CONVERGENCE FOR BORDER GATEWAY PROTOCL (BGP) SYSTEMS INCLUDING ONE OR MORE ROUTE REFLECTORS (RRS)

§ 1 BACKGROUND OF THE INVENTION

§ 1.1 Technical Field

Example embodiments consistent with the present description concern network communications. In particular, at least some such example embodiments concern improving the performance of protocols, such as the Border Gateway Protocol ("BGP") described in "A Border Gateway Protocol 4 (BGP-4)," *Request for Comments* 4271 (Internet Engineering Task Force ("IETF"), January 2006) (referred to as "RFC 4271 and incorporated herein by reference) and its updates and extensions.

§ 1.2 Background Information

In network communications system, protocols are used by devices, such as routers for example, to exchange network information. Routers generally calculate routes used to forward data packets towards a destination. Some protocols, such as the Border Gateway Protocol ("BGP"), which is summarized in § 1.2.1 below, allow routers in different autonomous systems ("ASes") to exchange reachability information.

§ 1.2.1 the Border Gateway Protocol ("BGP")

The Border Gateway Protocol ("BGP") is an inter-Autonomous System routing protocol. The following refers to the version of BGP described in RFC 4271 (and, for example, extensions and/or updates to RFC 4271). The primary function of a BGP speaking system is to exchange network reachability information with other BGP systems. This network reachability information includes information on the list of Autonomous Systems (ASes) that reachability information traverses. This information is sufficient for constructing a graph of AS connectivity, from which routing loops may be pruned, and, at the AS level, some policy decisions may be enforced.

It is normally assumed that a BGP speaker advertises to its peers only those routes that it uses itself (in this context, a BGP speaker is said to "use" a BGP route if it is the most preferred BGP route and is used in forwarding).

Generally, routing information exchanged via BGP supports only the destination-based forwarding paradigm, which assumes that a router forwards a packet based solely on the destination address carried in the IP header of the packet. This, in turn, reflects the set of policy decisions that can (and cannot) be enforced using BGP.

BGP uses the transmission control protocol ("TCP") as its transport protocol. This eliminates the need to implement explicit update fragmentation, retransmission, acknowledgement, and sequencing. When a TCP connection is formed between two systems, they exchange messages to open and confirm the connection parameters. The initial data flow is the portion of the BGP routing table that is allowed by the export policy, called the "Adj-RIBS-Out."

Incremental updates are sent as the routing tables change. BGP does not require a periodic refresh of the routing table. To allow local policy changes to have the correct effect without resetting any BGP connections, a BGP speaker should either (a) retain the current version of the routes advertised to it by all of its peers for the duration of the connection, or (b) make use of the Route Refresh extension. (See, e.g., "Route Refresh Capability for BGP-4," Request for Comments 2918 (IETF, September 2000)(referred to as "RFC 2918" and incorporated herein by reference).)

KEEPALIVE messages may be sent periodically to ensure that the connection is live. NOTIFICATION messages are sent in response to errors or special conditions. If a connection encounters an error condition, a NOTIFICATION message is sent, and the connection is closed.

A BGP peer in a different AS is referred to as an external peer, while a BGP peer in the same AS is referred to as an internal peer. Internal BGP and external BGP are commonly abbreviated as IBGP and EBGP, respectively.

If a particular AS has multiple BGP speakers and is providing transit service for other ASes, then care must be taken to ensure a consistent view of routing within the AS. A consistent view of the interior routes of the AS is provided by the IGP used within the AS. In some cases, it is assumed that a consistent view of the routes exterior to the AS is provided by having all BGP speakers within the AS maintain interior BGP ("IBGP") with each other.

Many routing protocols have been designed to run within a single administrative domain. These are known collectively as "Interior Gateway Protocols" ("IGPs"). Typically, each link within an AS is assigned a particular "metric" value. The path between two nodes can then be assigned a "distance" or "cost", which is the sum of the metrics of all the links that belong to that path. An IGP typically selects the "shortest" (minimal distance, or lowest cost) path between any two nodes, perhaps subject to the constraint that if the IGP provides multiple "areas", it may prefer the shortest path within an area to a path that traverses more than one area. Typically, the administration of the network has some routing policy that can be approximated by selecting shortest paths in this way. BGP, as distinguished from the IGPs, was designed to run over an arbitrarily large number of administrative domains ("autonomous systems" or "ASes") with limited coordination among the various administrations.

§ 1.2.1.1 Example Environment

FIG. 1 illustrates an example environment 100 in which example embodiments consistent with the present description may be used. The example environment 100 may include a single administrative entity (not shown) associated with multiple autonomous systems (ASes 110a, 110b, . . . 110c). The ASes 110a-110c include BGP routers 105a-105e. BGP routers within an AS generally run IBGP, while BGP routers peering with a BGP router in another AS generally run EBGP. As shown, BGP router 105b and 105c are peers (also referred to as "BGP speakers") in a BGP session (depicted as 120). During the BGP session 120, the BGP speakers 105b and 105c may exchange BGP UPDATE messages. Details of the BGP UPDATE message 190 are described in § 1.2.1.2 below.

§ 1.2.1.2 BGP "Update" Messages

In BGP, UPDATE messages are used to transfer routing information between BGP peers. The information in the UPDATE messages can be used to construct a graph that describes the relationships of the various ASes. More specifically, an UPDATE message is used to advertise feasible routes that share a common set of path attribute value(s) to a peer (or to withdraw multiple unfeasible routes from service). An UPDATE message may simultaneously advertise a feasible route and withdraw multiple unfeasible routes from service.

The UPDATE message 190 includes a fixed-size BGP header, and also includes the other fields, as shown in FIG. 1. (Note some of the shown fields may not be present in every UPDATE message). Referring to FIG. 1, the "Withdrawn Routes Length" field 130 is a 2-octets unsigned integer that indicates the total length of the Withdrawn Routes field 140 in octets. Its value allows the length of the Network Layer Reachability Information ("NLRI") field 170 to be determined, as specified below. Under RFC 4271, a value of 0 indicates that no routes are being withdrawn from service, and that the WITHDRAWN ROUTES field 140 is not present in this UPDATE message 190.

The "Withdrawn Routes" field 140 is a variable-length field that contains a list of IP address prefixes for the routes that are being withdrawn from service. Each IP address prefix is encoded as a 2-tuple 140' of the form <length, prefix>. The "Length" field 142 indicates the length in bits of the IP address prefix. A length of zero indicates a prefix that matches all IP addresses (with prefix, itself, of zero octets). The "Prefix" field 144 contains an IP address prefix, followed by the minimum number of trailing bits needed to make the end of the field fall on an octet boundary. Note that the value of trailing bits is irrelevant.

Still referring to FIG. 1, the "Total Path Attribute Length" field 150 is a 2-octet unsigned integer that indicates the total length of the Path Attributes field 160 in octets. Its value allows the length of the Network Layer Reachability Information ("NLRI") field 170 to be determined. A value of 0 indicates that neither the Network Layer Reachability Information field 170 nor the Path Attribute field 160 is present in this UPDATE message.

The "Path Attributes" field 160 is a variable-length sequence of path attributes that is present in every UPDATE message, except for an UPDATE message that carries only the withdrawn routes. Each path attribute is a triple <attribute type, attribute length, attribute value> of variable length. The "Attribute Type" is a two-octet field that consists of the Attribute Flags octet, followed by the Attribute Type Code octet.

Finally, the "Network Layer Reachability Information" field 170 is a variable length field that contains a list of Internet Protocol ("IP") address prefixes. The length, in octets, of the Network Layer Reachability Information is not encoded explicitly, but can be calculated as: UPDATE message Length−23−Total Path Attributes Length (Recall field 150.)−Withdrawn Routes Length (Recall field 130.) where UPDATE message Length is the value encoded in the fixed-size BGP header, Total Path Attribute Length, and Withdrawn Routes Length are the values encoded in the variable part of the UPDATE message, and 23 is a combined length of the fixed-size BGP header, the Total Path Attribute Length field, and the Withdrawn Routes Length field.

Reachability information is encoded as one or more 2-tuples of the form <length, prefix>170', whose fields are shown in FIG. 1 and described here. The "Length" field 172 indicates the length in bits of the IP address prefix. A length of zero indicates a prefix that matches all IP addresses (with prefix, itself, of zero octets). The "Prefix" field 174 contains an IP address prefix, followed by enough trailing bits to make the end of the field fall on an octet boundary. Note that the value of the trailing bits is irrelevant.

BGP UPDATE messages are not limited to the example format 190 described above.

§ 1.2.1.3 BGP Peering and Data Stores: The Conventional "RIB" Model

FIG. 2 is a diagram illustrating a conventional BGP RIB model in which a BGP speaker interacts with other BGP speakers (peers). (Recall, for example, that in FIG. 1, BGP routers 105b and 105c are peers (also referred to as "BGP speakers") in a BGP session (depicted as 120).) In FIG. 2, a BGP peer 210 has a session with one or more other BGP peers 250. The BGP peer 210 includes an input (for example, a control plane interface, not shown) for receiving, from at least one outside BGP speaker 250, incoming routing information 220. The received routing information is stored in Adj-RIBS-In storage 212. The information stored in Adj-RIBS-In storage 212 is used by a decision process 214 for selecting routes using the routing information. The decision process 214 generates "selected routes" as Loc-RIB information 216. The Loc-RIB information 216 is then stored in Adj-RIBS-Out storage 218. As shown by 230, the information in Adj-RIBS-Out storage is then provided to at least one outside BGP speaker peer device 250 in accordance with a route advertisement process.

Referring to communications 220 and 230, recall that BGP can communicate updated route information using the BGP UPDATE message.

More specifically, IETF RFC 4271 documents the current version of the BGP routing protocol. In it, the routing state of BGP is abstractly divided into three (3) related data stores (historically referred to as "information bases") that are created as part of executing the BGP pipeline. To reiterate, the Adj-RIBS-In 212 describe the set of routes learned from each (adjacent) BGP peer 250 for all destinations. The Loc-RIB 216 describes the result of the BGP decision process 216 (which may be thought of loosely as route selection) in choosing a best BGP route. The Adj-RIBS-Out 218 describe the process of injecting the selected route from the Loc-RIB 216 (or possibly a foreign route from another protocol) and placing it for distribution to (adjacent) BGP peers 250 using the BGP protocol (Recall, e.g. the UPDATE messages 190/230.).

§ 1.2.1.4 Processing BGP Update Messages

Section 6.3 of RFC 4271 describes handling errors in BGP UPDATE messages. Error checking of an UPDATE message begins by examining the path attributes. If the UPDATE message is received from an external peer, the local system may check whether the leftmost (with respect to the position of octets in the protocol message) AS in the AS_PATH attribute is equal to the autonomous system number of the peer that sent the message. If an optional attribute is recognized, then the value of this attribute is checked for any errors. The NLRI field in the UPDATE message is checked for syntactic validity. "Revised Error Handling for BGP UPDATE Messages," *Request for Comments:* 7606 (Internet Engineering Task Force (IETF), August 2015) (referred to as "RFC 7606" and incorporated herein by reference) describes updates to how errors in BGP UPDATE messages are handled.

Section 9 of RFC 4271 describes how to handle a BGP UPDATE message. As just noted above, when an UPDATE message is received, each field is checked for validity. If an optional non-transitive attribute is unrecognized, it is quietly ignored. If an optional transitive attribute is unrecognized, the Partial bit (the third high-order bit) in the attribute flags octet is set to 1, and the attribute is retained for propagation to other BGP speakers. If an optional attribute is recognized and has a valid value, then, depending on the type of the optional attribute, it is processed locally, retained, and updated, if necessary, for possible propagation to other BGP speakers. Under RFC 4271, if the UPDATE message contains a non-empty WITHDRAWN ROUTES field (Recall, e.g., 140.), the previously advertised routes, whose destinations (expressed as IP prefixes) are contained in this field, are removed from the Adj-RIB-In (Recall, e.g., 212.). The BGP speaker will then run its Decision Process (Recall, e.g., 214.) because the previously advertised route is no longer available for use. If the UPDATE message contains a feasible route, the Adj-RIB-In will be updated with this route as follows: if the NLRI of the new route is identical to the one the route currently has stored in the Adj-RIB-In, then the new route replaces the older route in the Adj-RIB-In, thus implicitly withdrawing the older route from service. Otherwise, if the Adj-RIB-In has no route with NLRI identical to the new route, the new route is placed in the Adj-RIB-In. Once the BGP speaker updates the Adj-RIB-In, the BGP speaker runs its Decision Process.

The Decision Process selects routes for subsequent advertisement by applying the policies in the local Policy Information Base ("PIB") to the routes stored in its Adj-RIBs-In. The output of the Decision Process is the set of routes that will be advertised to peers; the selected routes will be stored in the local speaker's Adj-RIBs-Out (Recall, e.g., 218.), according to policy. The selection process is formalized by defining a function that takes the attribute of a given route as an argument and returns either (a) a non-negative integer denoting the degree of preference for the route, or (b) a value denoting that this route is ineligible to be installed in Loc-RIB and will be excluded from the next phase of route selection. Route selection then consists of the individual application of the degree of preference function to each feasible route, followed by the choice of the one with the highest degree of preference. The Decision Process operates on routes contained in the Adj-RIBs-In, and is responsible for: (i) selection of routes to be used locally by the speaker; (ii) selection of routes to be advertised to other BGP peers; and (iii) route aggregation and route information reduction. The Decision Process takes place in three distinct phases, each triggered by a different event. Phase 1 is responsible for calculating the degree of preference for each route received from a peer. Phase 2 is invoked on completion of phase 1. It is responsible for choosing the best route out of all those available for each distinct destination, and for installing each chosen route into the Loc-RIB. Phase 3 is invoked after the Loc-RIB has been modified. It is responsible for disseminating routes in the Loc-RIB to each peer, according to the policies contained in the PIB. Route aggregation and information reduction can optionally be performed within this phase.

The Update-Send process is responsible for advertising UPDATE messages to all peers. For example, it distributes the routes chosen by the Decision Process to other BGP speakers, which may be located in either the same autonomous system or a neighboring autonomous system. When a BGP speaker receives an UPDATE message from an internal peer, the receiving BGP speaker does not re-distribute the routing information contained in that UPDATE message to other internal peers (unless the speaker acts as a BGP Route Reflector). (See, e.g., "BGP Route Reflection: An Alternative to Full Mesh Internal BGP (IBGP)," Request for Comments 4456 (IETF, April 2006)(referred to as "RFC 4456" and incorporated herein by reference).) As part of Phase 3 of the route selection process, the BGP speaker has updated its Adj-RIBs-Out. All newly installed routes and all newly unfeasible routes for which there is no replacement route are advertised to its peers by means of an UPDATE message. A BGP speaker should not advertise a given feasible BGP route from its Adj-RIB-Out if it would produce an UPDATE message containing the same BGP route as was previously advertised. Any routes in the Loc-RIB marked as unfeasible are removed. Changes to the reachable destinations within its own autonomous system are advertised in an UPDATE message. If, due to the limits on the maximum size of an UPDATE message, a single route doesn't fit into the message, the BGP speaker will not advertise the route to its peers, withdraw any previously advertised route for the same destination, and may choose to log an error locally.

§ 1.2.2 BGP Route Reflectors ("RRs") and Clustering RRs

Most networks use route reflectors to simplify configuration, which would otherwise become complex because of the internal BGP ("IBGP") full-mesh requirement. The formula to compute the number of sessions required for a full mesh is $N*(N-1)/2$, where N is the number of BGP-enabled devices. As can be appreciated from this formula, the full-mesh model does not scale well. Using a route reflector, routers can be grouped into clusters, which are identified by numeric identifiers unique to the autonomous system ("AS"). Within the cluster, a BGP session is configured from a single router (i.e., the route reflector) to each internal peer. (Alternatively, two or more route reflectors may be provided for purposes of redundancy. Note that all redundant route reflectors in a cluster may be, though are not required to be, configured with the same CLUSTER_ID.) With such a configuration, the IBGP full-mesh requirement is alleviated.

To use route reflection in an AS, one or more routers are designated as a route reflector; typically, two per point of presence ("POP"). Route reflectors have the special BGP ability to re-advertise routes learned from an internal peer to other internal peers. So rather than requiring all internal peers to be fully meshed with each other, route reflection requires only a fully connected peering topology (e.g., that the route reflector(s) may be connected with all internal peers, or may be connected recursively such that a route reflector connects to a higher route reflector connects to a still higher one, and then the reverse down back towards the leaves, so that there is transitive connectivity across the AS). A route reflector and all of its internal peers form a cluster, as shown in the simplified topology of FIG. 3. Generally, a RR and its client peers form a cluster.

In FIG. 3, router 320 is configured as the route reflector for "Cluster 127" 310. The other routers 330*a*-330*d* in the cluster 310 are designated as internal peers within the cluster. BGP routes are advertised to RR 320 by any of the internal peers 330. RR 320 then re-advertises those routes to all other peers 330 within the cluster 310.

As illustrated in FIG. 4, multiple clusters 410*a*-410*d* can be configured, and these clusters 410 can be linked to one another by configuring a full mesh of route reflectors 420*a*-420*d*. More specifically, route reflectors RR A, RR B, RR C, and RR D are fully meshed internal peers. When a router 430a in cluster 410a advertises a route to RR A, RR A re-advertises the route to the other route reflectors 420b-420d. Each of these route reflectors 420b-420d, in turn, re-advertise the route to the remaining routers 410b, 410c, or 410d, within their respective clusters (e.g., within their respective AS(es)).

Route reflection allows routes to be propagated throughout the AS without the scaling problems created by the full mesh requirement. Unfortunately, as clusters become large, a full mesh with a single route reflector such as that 300 in FIG. 3 becomes difficult to scale, as does a full mesh between route reflectors such as that 400 in FIG. 4. Referring to FIG. 5, to help offset this problem, parts of (e.g., regional) clusters of routers 520/530 may be grouped together into a cluster of clusters to provide hierarchical route reflection. As shown, RRR1, RRR2, RRR3, and RRR4 are provided as the regional route reflectors 520 for cluster numbers 127, 19, 45 and 82, respectively. Rather than fully mesh regional route reflectors RRR1-RRR4 520 in a manner such as that 400 in FIG. 4, regional route reflectors RRR1 and RRR2 and continental route reflector CRR1 are configured to be part of another cluster (cluster number 6), and similarly, regional route reflectors RRR3 and RRR4 and continental route reflector CRR2 are configured to be part of yet another cluster (cluster number 7). CRR1 and CRR2 are IBGP peers of one another. In the simplified network 500 of FIG. 5: (1) each region (A-D) has one (1) RR and all of the BGP speaking routers are peered to the regional RR; (2) regional RRs (RRRs) are peered to Continental RRs (CRRs); (3) the CRRs have full mesh BGP peering among themselves; (4) none of the RRs are used for forwarding customer traffic; they are only used to aggregate/reflect routes (Note that certain forwarding plane devices are not shown, to simplify the drawing.); (5) peering routers (R1, R2) are configured with BGP multipath, advertise-inactive, keep none, add-path receive, add-path send knobs; (6) RRs are configured with add-path send and add-path receive; and (7) RRs don't have any policy configured to filter or modify any BGP prefix. Although not shown in the simplified example of FIG. 5, in an actual network, there would likely be multiple regional RRs within a region (e.g., for redundancy), and they would have a full mesh between them, as well as peerings to CRRs. The CRRs would likely be configured with no-client-reflect.

Consider the following example. When router R3 (or R4) 530 advertises a route to RRR2 520, RRR2 520 both (1) re-advertises the route to all the (other) routers within its own cluster (#19) (e.g., R4 (or R3) 530), and (2) re-advertises the route to CRR1 550. Responsive to receiving this new route, CRR1 550 re-advertises the route to the (other) client routers in its cluster (#6) (e.g., RRR1, which happens to be a route reflector), as well as peered CRR2. CRR2 550 re-advertises the route to other client routers in cluster #7 (e.g., RRR3 and RRR4). The route reflectors RRR1, RRR3 and RRR4 each re-advertise the route down through their respective clusters.

A large network (e.g., of a large content provider) may implement a hierarchical arrangement of route reflectors, such as that 500 illustrated in FIG. 5. Moreover, operators of many large networks often implement BGP route reflectors such that their sole (or primary) role is to merely reflect routes, especially since they heavily rely on multiple equal cost multipath ("ECMP") paths across all layers. This can be achieved using configuration options (e.g., "knobs" available on routers from Juniper Networks, Inc. of Sunnyvale, Calif.) such as "multipath," "advertise-inactive," "keep none," "add-path receive" and "add-path send." That is, using these configuration options, a route reflector may be configured to merely reflect (without doing any kind of filtering on the routes) all of the routes it receives from the neighbor routers to the other client routers within its cluster.

With the current standards and implementation of BGP, a route reflector must perform a number of processing steps, even if these are ultimately not required by the operator's network design. In such a case, the processing isn't necessary and causes delay in propagating (via one or more re-advertisements) a route update to a router(s). For example, FIG. 6 is a flow diagram of an example method 600 for processing a BGP UPDATE message in a manner consistent with RFC 4271. As already discussed above, when a BGP UPDATE message is received, each field is checked for validity. (Block 610) Then, the relevant Adj-RIB-In is updated with the NLRI(s) of any new route(s) and the NLRI(s) of any withdrawn route(s). (Block 620) (Recall 212.) This may include opening the BGP NLRI(s), extracting any new and/or withdrawn route(s), and validating, for each route, that is next hop is reachable. Next, a decision process is run to select route(s) for subsequent advertisement. (Block 630) In a first phase of the decision process, a degree of preference is calculated for each route received from a peer. (Block 632) In a second phase of the decision process, which is invoked upon completion of the first phase, the best route out of all of those available for each distinct destination is chosen, and each chosen route is installed into the LOC-RIB. (Block 634) (Recall 216.) In a third phase of the decision process, which is invoked after the LOC-RIB has been modified), the Adj-RIBs-Out are updated (Recall 218.), and routes in the LOC-RIB are disseminated to each peer according to policies contained in a local policy information base ("PIB"). (Block 636) After the three phases of the decision process are completed, the method 600 is left. (Node 640)

Referring back to block 636 of FIG. 6, if the BGP UPDATE message is received by a RR, the RR will (1) add its own cluster ID to the non-transitive path attribute (Recall 160 of FIG. 1.) CLUSTER_LIST, and (2) set the non-transitive path attribute ORIGINATOR_ID to the BGP Identifier of the peer from which the BGP UPDATE was received, or simply propagate an ORIGINATOR_ID if one was already present in the received BGP UPDATE. Thus, in summary, when a RR receives a BGP UPDATE message (Recall, e.g., FIG. 1.), if the UPDATE includes a new prefix (received from RR-client or non-client that must be reflected to an RR-client), the RR validates each route's prefix next-hop reachability before it determines whether or not to reflect the route to its peer RR-client(s). (Recall, e.g., block 610.) If the UPDATE includes a new prefix or a withdrawn prefix, the RR: (1) performs a decision process to select the best route/prefix selection (Recall, e.g., blocks 632 and 634.); and (2) constructs one or more new UPDATE message(s) with the best route(s) by updating CLUSTER_LIST and ORIGINATOR_ID path attribute fields in the UPDATE message (Recall, e.g., block 636) and sends the new UPDATE message (or multiple UPDATE messages) to its peer RR-client(s), other than the peer from which the UPDATE message was received (Recall, e.g., block 636.)

With a hierarchical implementation of BGP, for example using regional RRs (RRRs) and continental RRs (CRRs) such as that 500 of FIG. 5, the delay in getting the routes at clients increases further because each route reflector processes every NLRI (Recall, e.g., 170 of FIG. 1.) before deciding to send the route to its clients and peers. Such delays can become especially long if multiple re-advertisements become necessary, such as in the example scenario described below with reference to FIG. 5.

A common problem for operators of very large networks is the delay in route propagation from one RR-client (e.g., R3 530) to another RR-client in another cluster (e.g., R5 530). Referring again to FIG. 5, suppose R3 receives reachability information for a newly connected device. It is fairly trivial for this reachability information to reach R4 (re-advertised by RRR2) since they are in the same cluster (#19) 510. However, for this new reachability information to reach R1 and R2, it must be re-advertised by RRR2, then CRR1, and then RRR1; to reach R5 and R6, it must be re-advertised by RRR2, then CRR1, then CRR2 and then RRR3; and to reach R7 and R8, it must be re-advertised by RRR2, then CRR1, then CRR2 and finally RRR4. Thus, in the example of FIG. 5, reachability information for a device newly connected to R3 must be re-advertised once to reach R4, must be re-advertised thrice to reach R1 and R2, and must be re-advertised four times to reach R5-R8. As should be appreciated from this simple example, reachability updates that have to cross other region(s) and/or continent(s), may require an unacceptable amount of delay due to unnecessary processing by each RR re-advertising the route.

As should be appreciated from the foregoing, it would be useful to provide faster route propagation and avoid delays associated with processing BGP UPDATE messages (NLRI with advertisements and withdrawals) at each hop the NLRIs using conventional BGP such as next-hop validation, best path selection, etc. It would be useful if such faster route propagation could be accomplished without compromising configuration options, such as configuration options used to achieve multiple ECMP paths at each level.

§ 2. SUMMARY OF THE INVENTION

Example embodiments consistent with the present description provide a computer-implemented method which may be implemented on route reflector. The example embodiments may receive, by the route reflector, a Border Gateway Protocol (BGP) UPDATE message. Then, responsive to receiving the BGP UPDATE message, the route reflector may (1) update a CLUSTER_LIST value and, if needed, an ORIGINATOR_ID value, in a path attribute section in the BGP UPDATE message to generate a revised BGP UPDATE message, and (2) send the revised BGP UPDATE message to a client of the route reflector, regardless of whether or not one of (A) field validity checking of the BGP UPDATE message, (B) Adj-RIBS-In update using the BGP UPDATE message, (C) decision processing for route selection using information in the BGP UPDATE message, or (D) Adj-RIBS-Out update using the BGP UPDATE message, is completed.

In some embodiments consistent with the present description, the route reflector may further determine that the client of the route reflector is capable of processing the revised BGP UPDATE message. This act of determining may have been performed before the act of sending the revised BGP UPDATE message.

In some example embodiments consistent with the present description, responsive to receiving the BGP UPDATE message, and after sending the revised BGP UPDATE message to a client of the route reflector, the route reflector may further check validity of fields of the BGP UPDATE message. In some example embodiments consistent with the present description, responsive to receiving the BGP UPDATE message, and after sending the revised BGP UPDATE message to a client of the route reflector, the route reflector may further update Adj-RIBS-In information, stored on the route reflector, using the BGP UPDATE message. In some example embodiments consistent with the present description, responsive to receiving the BGP UPDATE message, and after sending the revised BGP UPDATE message to a client of the route reflector, the route reflector may further perform decision processing for route selection, by the route reflector, using information in the BGP UPDATE message. Finally, in some example embodiments consistent with the present description, responsive to receiving the BGP UPDATE message, and after sending the revised BGP UPDATE message to a client of the route reflector, the route reflector may further update Adj-RIBS-Out information, stored on the route reflector, using the BGP UPDATE message.

In some example embodiments consistent with the present description, the act of sending, by the route reflector, the revised BGP UPDATE message to a client of the route reflector, is performed regardless of whether or not one of (A) field validity checking of the BGP UPDATE message, (B) Adj-RIBS-In update using the BGP UPDATE message, (C) decision processing for route selection using information in the BGP UPDATE message, or (D) Adj-RIBS-Out update using the BGP UPDATE message, is started.

In some example embodiments consistent with the present description, the client of the route reflector receives the revised BGP UPDATE message. Responsive to receiving the revised BGP UPDATE message, the client may (1) generate a unique path identifier using information from both (i) a path identifier carried in the revised BGP UPDATE message received, and (ii) the ORIGINATOR_ID value carried in the revised BGP UPDATE message received, and (2) process the revised BGP UPDATE message received using the generated unique path identifier.

§ 3. BRIEF DESCRIPTION OF THE DRAWINGS

FIGS. 12A and 12B is an example of operations of the example architecture of FIG. 11.

§ 4. DETAILED DESCRIPTION

Figure 1:
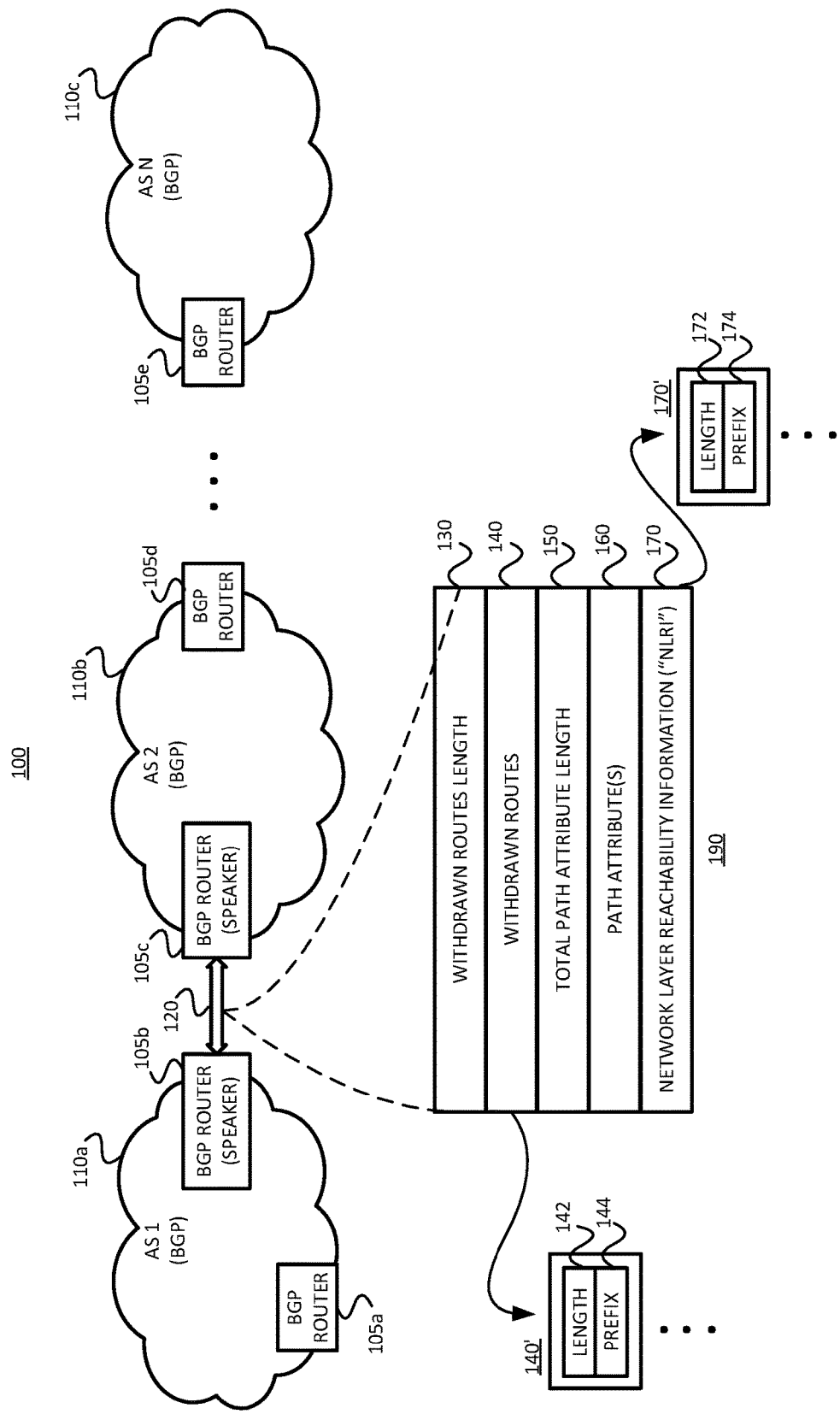
FIG. 1 illustrates an example environment, illustrating BGP sessions in which example embodiments consistent with the present description may be used.
Figure 2:
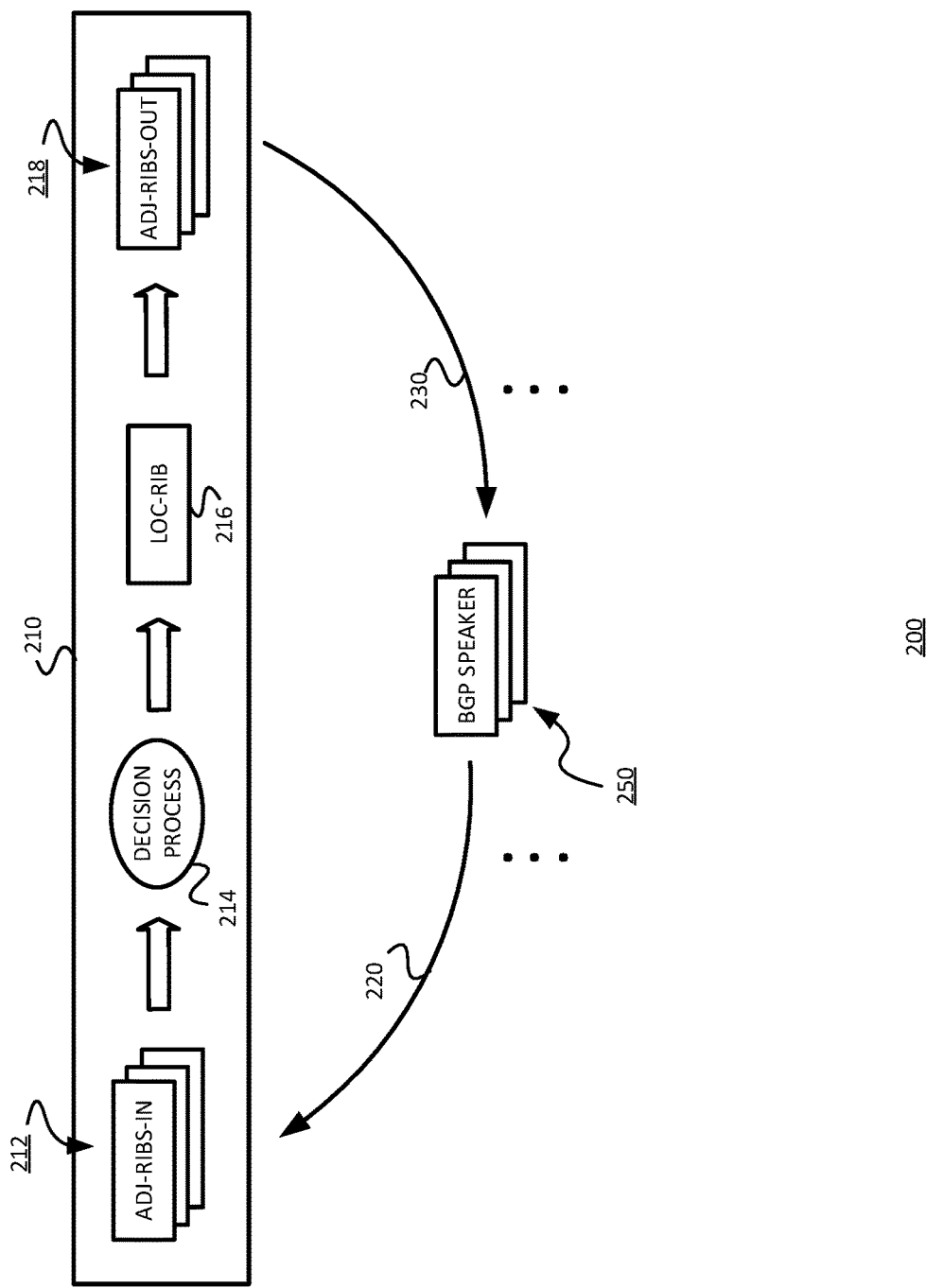
FIG. 2 is a diagram illustrating a conventional BGP RIB model in which a BGP speaker interacts with other BGP speakers (peers).
Figure 3:
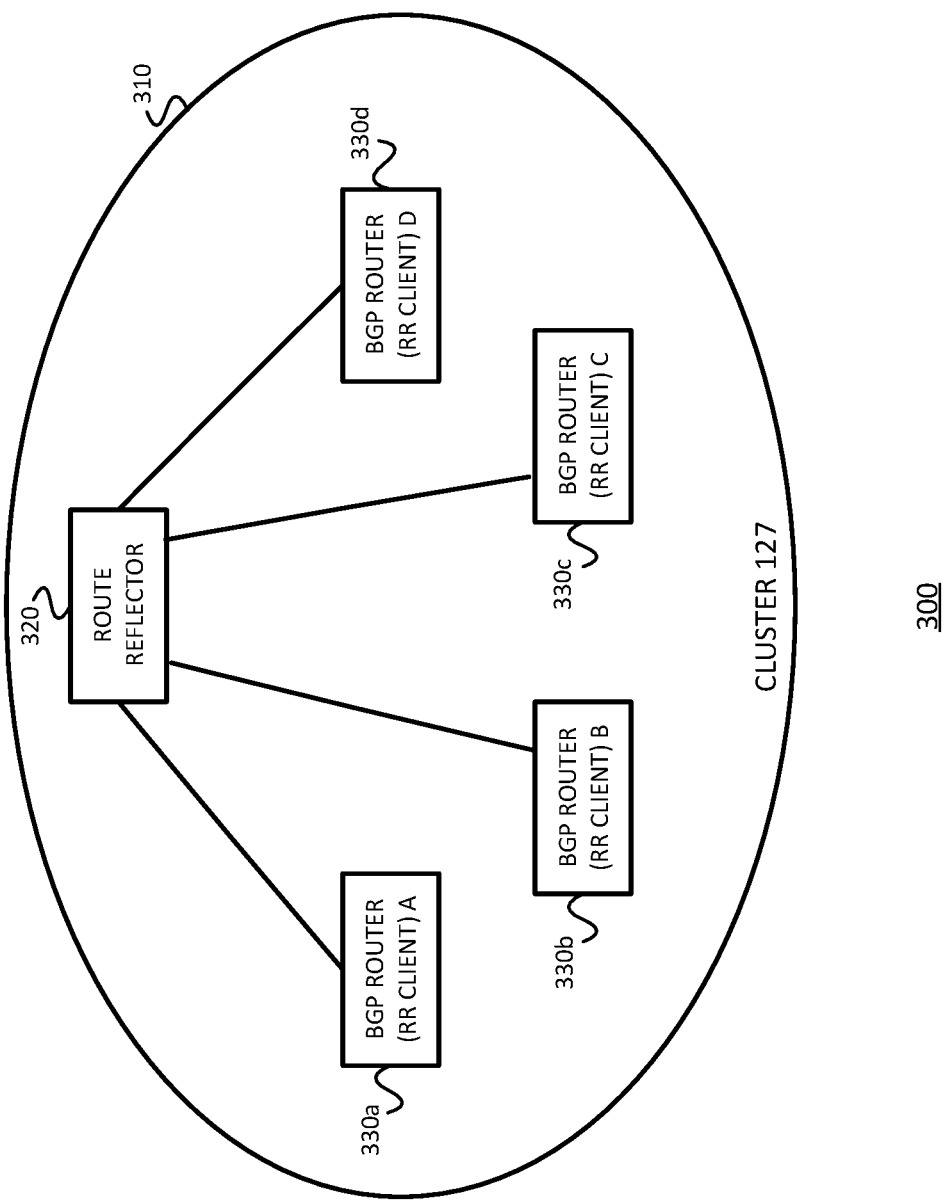
FIG. 3 illustrates a cluster including a route reflector (RR) and internal peers (RR-clients).

The present disclosure may involve novel methods, apparatus, message formats, and/or data structures for faster propagation of BGP UPDATE messages by route reflectors. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

As discussed above, when a RR receives a BGP UPDATE message (Recall, e.g., FIG. 1.), if the UPDATE includes a new prefix (received from RR-client or non-client that must be reflected to an RR-client), the RR validates each routes' prefix next-hop reachability before it determines whether or not to reflect the route to its peer RR-client(s). (Recall, e.g., block 610.) If the UPDATE includes a new prefix or a withdrawn prefix, the RR: (1) performs a decision process to select the best route/prefix selection (Recall, e.g., blocks 632 and 634.); and (2) constructs a new UPDATE message with the best route(s) by updating CLUSTER_LIST and ORIGINATOR_ID path attribute fields in the UPDATE message (Recall, e.g., block 636) and sends the new UPDATE message to its client(s) and/or peers, other than the peer from which the UPDATE message was received (Recall, e.g., block 636.) The present inventors recognized that a RR could reflect a received UPDATE message without having had performed each and every one of the foregoing steps. That is, the present inventors recognized that it is possible, with appropriate configuration and/or processing, to first send a received BGP UPDATE to the RR-clients peers without (or at least before) processing the BGP UPDATE. After sending the received BGP UPDATE to its client(s), the RR may later process the new or withdrawn route(s), and build its LOC-RIBS and Adj-RIBs-Out databases.

§ 4.1 Definitions

Adj-RIB-In: The Adj-RIBs-In contain unprocessed routing information that has been advertised to the local BGP speaker by its peers.

Adj-RIB-Out: The Adj-RIBs-Out contain the routes for advertisement to specific peers by means of the local speaker's UPDATE messages.

Autonomous System (AS): The classic definition of an Autonomous System is a set of routers under a single technical administration, using an interior gateway protocol (IGP) and common metrics to determine how to route packets within the AS, and using an inter-AS routing protocol to determine how to route packets to other ASes. Since this classic definition was developed, it has become common for a single AS to use several IGPs and, sometimes, several sets of metrics within an AS. The use of the term Autonomous System stresses the fact that, even when multiple IGPs and metrics are used, the administration of an AS appears to other ASes to have a single coherent interior routing plan, and presents a consistent picture of the destinations that are reachable through it.

BGP Identifier: A 4-octet unsigned integer that indicates the BGP Identifier of the sender of BGP messages. A given BGP speaker generally sets the value of its BGP Identifier to a 4-octet, unsigned, non-zero integer (e.g., an IP address) assigned to that BGP speaker. (See, e.g., "Autonomous-System-Wide Unique BGP Identifier for BGP-4," *Request for Comments* 6286 (Internet Engineering Task Force, June 2011)(referred to as "RFC 6286" and incorporated herein by reference.) The value of the BGP Identifier is determined upon startup and is generally the same for every local interface and BGP peer.

BGP speaker: A router that implements BGP.

CRR: Continental Route Reflector

EBGP: External BGP (BGP connection between external peers).

External peer: Peer that is in a different Autonomous System than the local system.

Feasible route: An advertised route that is available for use by the recipient.

IBGP: Internal BGP (BGP connection between internal peers).

Internal peer: Peer that is in the same Autonomous System as the local system.

IGP: Interior Gateway Protocol—a routing protocol used to exchange routing information among routers within a single Autonomous System.

Loc-RIB: The Loc-RIB contains the routes that have been selected by the local BGP speaker's Decision Process.

NLRI: Network Layer Reachability Information.

Route: A unit of information that pairs a set of destinations with the attributes of a path to those destinations. The set of destinations are systems whose IP addresses are contained in one IP address prefix carried in the Network Layer Reachability Information (NLRI) field of an UPDATE message. The path is the information reported in the path attributes field of the same UPDATE message.

RIB: Routing Information Base.

RR: Route Reflector

RRR: Regional Route Reflector

RR peers: Devices that run normal IBGP.

RR clients: Devices to which route-reflection rules are applied. Assuming that the route reflector is performing reflection between clients (so-called client-to-client reflection) which is the default, then (1) a route from client A is sent to all clients other than A, and all peers, and (2) a route from peer B is sent to all clients. If client-to-client reflection is disabled (which implies that RR clients must have an IBGP mesh between themselves) then (1) a route from client A is sent to all peers, and (2) a route from peer B is sent to all clients.

Unfeasible route: A previously advertised feasible route that is no longer available for use.

§ 4.2 Example Methods

Figure 7:
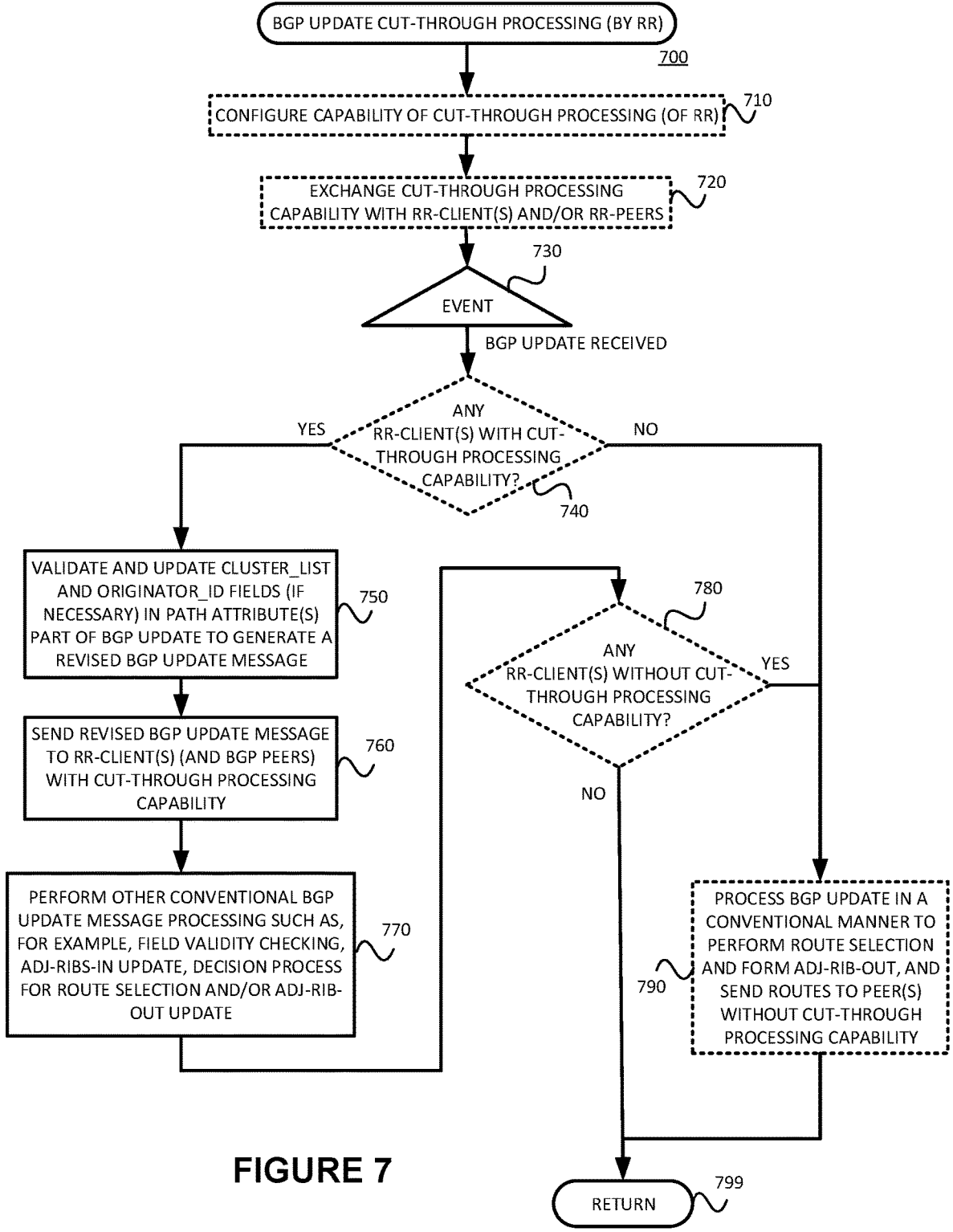
FIG. 7 is a flow diagram of an example method for performing BGP UPDATE processing by a RR in a cut-through manner (to achieve faster convergence) consistent with the present description.

FIG. 7 is a flow diagram of an example method 700 for performing BGP UPDATE processing by a RR in a cut-through manner (to achieve faster convergence) consistent with the present description. First, the RR is configured so that it can perform cut-through processing of BGP updates. (Block 710) Such configuration can be done globally or on a per group basis. Details of an example way(s) to provide such configuration are described in § 4.5.1 below. After cut-through processing is configured on the RR, its capability of cut-through processing is announced to RR-client(s) and/or BGP peers (e.g., during the BGP session set up phase). (Block 720) During this capabilities exchange, the RR will learn which of its RR-client(s) and/or BGP peers have cut-through processing capabilities, and vice-versa. Details of an example way(s) to perform such capabilities exchange are described in § 4.5.2 below. Once the BGP state between the RR and its RR-client(s) and/or BGP peer(s) is synchronized, the RR can perform cut-through reflection of BGP UPDATES to the capable RR-client and/or BGP peers. Being "synchronized" is intended to mean that the entire Adj-RIB-Out has to have been successfully transmitted to the peer. This can be known locally as a router will know whether or not it still has pending routes left to send. In some example embodiments, a router might assume that synchronization has not been completed until the Adj-RIB-Out (including any updates that are made to it as the result of reflected UPDATEs) has been sent.

The rest of the example method 700 is performed responsive to the occurrence of an event; namely, that a BGP UPDATE is received. (Event 730) When a BGP UPDATE is received by the RR, is it determined whether or not the RR has any RR-client(s) (and/or BGP peers) with cut-through processing capabilities. (Decision 740) If, on the one hand, the RR has at least one RR-client(s) (and/or BGP peers) with cut-through processing capabilities (Decision 740, YES), the example method 700 validates and updates the CLUSTER_LIST value and, if needed, the ORIGINATOR_ID value, in the path attribute(s) section 160 of the BGP UPDATE to generate a revised BGP UPDATE message. (Block 750) The revised BGP UPDATE message is then sent to the RR-clients (and/or BGP peers) with the cut-through processing capability (Block 760) Next, after the RR completes (or at least initiates) the cut-through reflection of UPDATE messages, the example method 700 performs other conventional BGP UPDATE message processing such as, for example, field validity checking, Adj-RIBS-In update, decision process for route selection, and/or Adj-RIBS-Out update. (Block 770) Note that the revised BGP UPDATE message was sent (reflected) before the other conventional BGP UPDATE message processing was performed. More generally, sending the revised BGP UPDATE message does not need to wait for the completion of other conventional BGP UPDATE message processing, that otherwise would have to have been completed. This allows BGP route updates (new and/or withdrawn) to propagate faster than in the conventional case. Note that blocks 750, 760 and 770 define an important part of the example method 700.

The example method 700 then determines whether or not there are any RR-clients (and/or BGP peers) without the cut-through processing capability. (Decision 780) If not (Decision 780, NO), the method 700 is left. (Node 799) If, on the other hand, it is determined that there is at least one RR-client (and/or BGP peer) without the cut-through processing capability (Decision 780, YES), the received BGP UPDATE may be processed in a conventional manner (e.g., to perform route selection and form Adj-RIB-Out) and sent (or reflected) to such RR-client(s) (and/or BGP peer(s)) (Block 790) before the method 700 is left (Node 799)

Referring back to decision 740, if it was determined that there are no RR-client(s) (and/or BGP peer(s)) with the cut-through processing capability (Decision 740, NO), the example method 700 proceeds to block 790, which was already described above.

Referring back to blocks 710 and 720, as is known, BGP uses the transport control protocol (TCP) as its transport protocol and listens on TCP port 179. A TCP connection is formed between two systems (e.g., two BGP peers). The two systems exchange messages to open and confirm the connection parameters. After a TCP connection is established, the first message sent by each side is an OPEN message. If the OPEN message is acceptable, a KEEPALIVE message confirming the OPEN is sent back. KEEPALIVE messages are exchanged between peers often enough so that the BGP session does not expire. UPDATE messages are used to transfer routing information between BGP peers. The information in the UPDATE message can be used to construct a graph that describes the relationships of the various ASes. A NOTIFICATION message may be sent when an error condition is detected. (See RFC 7606.) The BGP connection is closed responsive to a NOTIFICATION message being sent.

Referring back to block 770, processing the received UPDATE and building the respective Adj-RIBS-In and Adj-RIBS-Out for each RR-client (and/or BGP peer) and updating its routing table even after sending the revised BGP UPDATE message will help in providing BGP UPDATE messages to new sessions that are established towards the RR, and/or help in providing BGP UPDATE messages during route-refresh.

Conventional CLUSTER_LIST validation may be performed by the RR for loop prevention.

Figure 8:
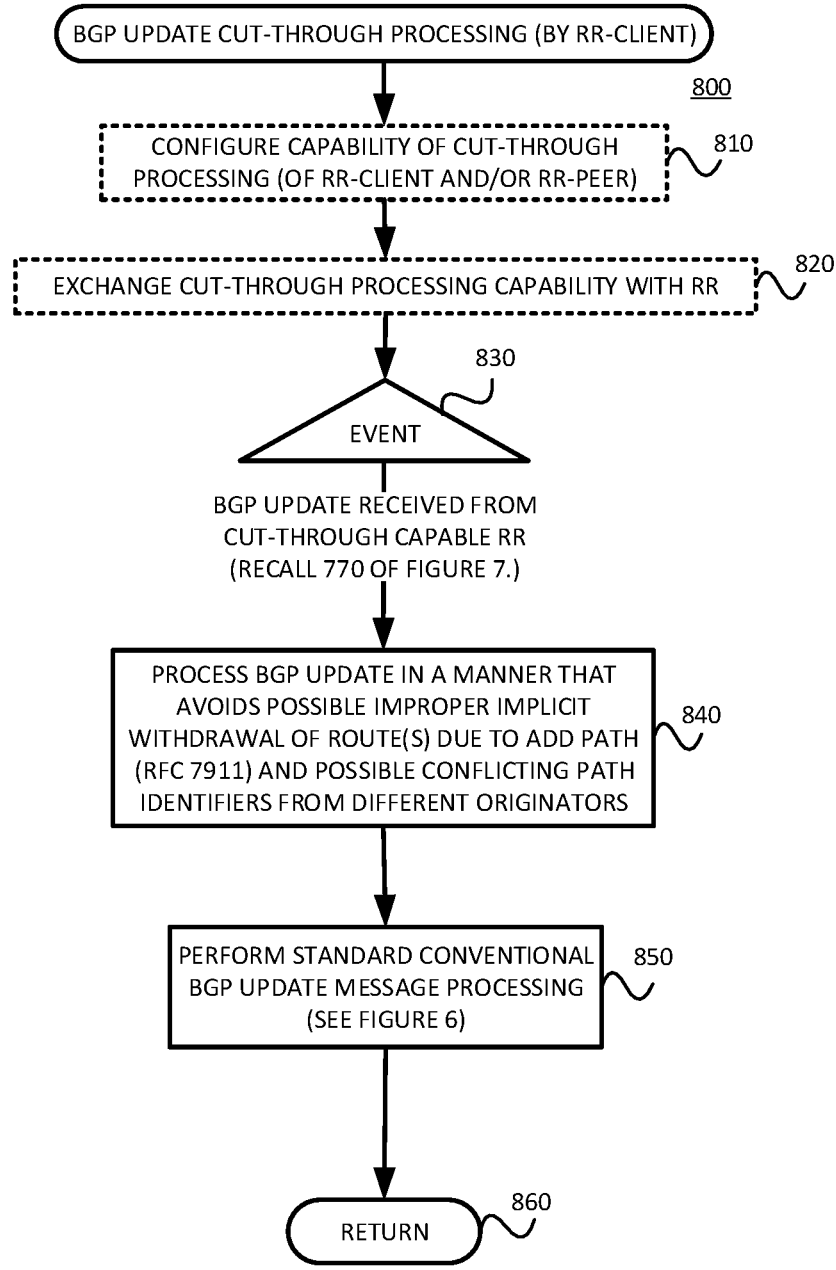
FIG. 8 is a flow diagram of an example method 800 for performing BGP UPDATE processing by a RR-client in a cut-through manner (to achieve faster convergence) consistent with the present description.

FIG. 8 is a flow diagram of an example method 800 for performing BGP UPDATE processing by a RR-client in a cut-through manner (to achieve faster convergence) consistent with the present description. First, the RR-client is configured so that it can process cut-through BGP UPDATE messages. (Block 810) Such configuration can be done globally or on a per group basis. Details of an example way(s) to provide such configuration are described in § 4.5.1 below. After processing of cut-through BGP UPDATE messages is configured on the RR-client, its capability is announced to RR(s) (e.g., during the BGP session set up phase). (Block 820) As described above with reference to FIG. 7, during this capabilities exchange, the RR will learn which of its RR-client(s) and/or BGP peers have cut-through processing capabilities, and vice-versa. Details of an example way(s) to perform such capabilities exchange are described in § 4.5.2 below.

The rest of the example method 800 is performed responsive to the occurrence of an event; namely, that a BGP UPDATE is received from a cut-through capable RR. (Event 830) When such a BGP UPDATE is received by the RR-client, it is processed in a manner that avoids possible implicit withdrawal of route(s) (e.g., due to add path) and that avoids possible conflicting path identifiers from different originators. (Block 840) Conventional processing of the BGP UPDATE (except for that processing of block 840) may be performed. (Block 850) The example method 800 is then left. (Node 860)

Referring back to block 840, § 5.4.3 below describes example ways to avoid unwanted implicit withdrawal of routes per "Advertisement of Multiple Paths in BGP," Request For Comments 7911 (Internet Engineering Task Force, July 2016)(referred to as "RFC 7911" or "BGP add-path" and incorporated herein by reference)

§ 4.3 Example Apparatus

Figure 9:
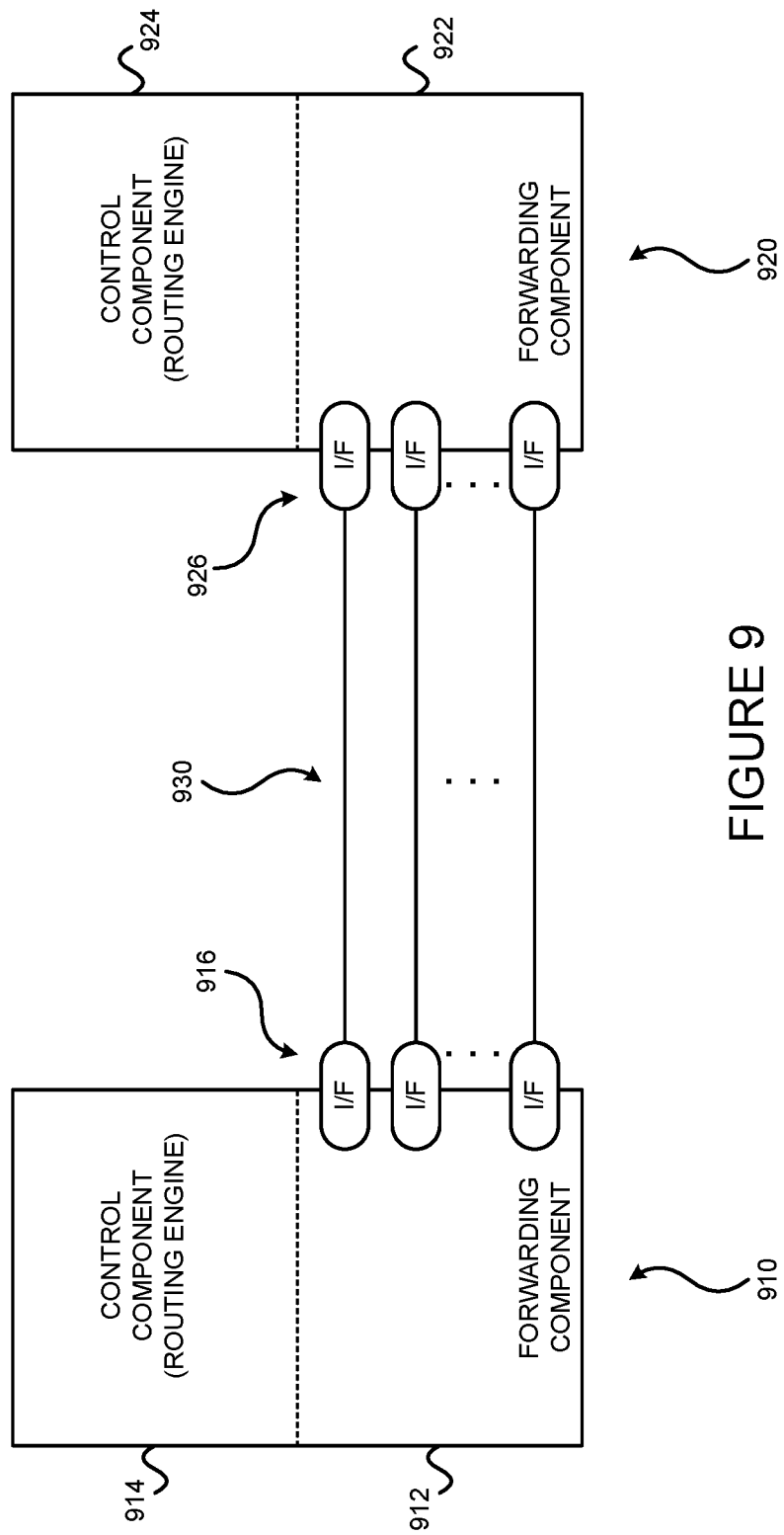
FIG. 9 illustrates two data forwarding systems, which may be used as BGP peers, such as a RR and a RR-client, coupled via communications links.

FIG. 9 illustrates two data forwarding systems 910 and 920 coupled via communications links 930. The links may be physical links, virtual links, or "wireless" links. The data forwarding systems 910, 920 may be routers for example, and may be RR and an RR-client or RR-peer. If the data forwarding systems 910, 920 are example routers, each may include a control component (e.g., a routing engine) 914, 924 and a forwarding component 912, 922. Each data forwarding system 910, 920 includes one or more interfaces 916, 926 that terminate one or more communications links 930. The example method 700 may be implemented on the control component 914, 924.

As just discussed above, and referring to FIG. 10, some example routers 1000 include a control component (e.g., routing engine) 1010 and a packet forwarding component (e.g., a packet forwarding engine) 1090.

The control component 1010 may include an operating system (OS) kernel 1020, routing protocol process(es) 1030, label-based forwarding protocol process(es) 1040, interface process(es) 1050, user interface (e.g., command line interface) process(es) 1060, and chassis process(es) 1070, and may store routing table(s) 1039, label forwarding information 1045, and forwarding (e.g., route-based and/or label-based) table(s) 1080. As shown, the routing protocol process(es) 1030 may support routing protocols such as the routing information protocol ("RIP") 1031, the intermediate system-to-intermediate system protocol ("IS-IS") 1032, the open shortest path first protocol ("OSPF") 1033, the enhanced interior gateway routing protocol ("EIGRP") 1034 and the border gateway protocol ("BGP") 1035, and the label-based forwarding protocol process(es) 1040 may support protocols such as BGP 1035, the label distribution protocol ("LDP") 1036 and the resource reservation protocol ("RSVP") 1037. One or more components (not shown) may permit a user 1065 to interact with the user interface process(es) 1060. Similarly, one or more components (not shown) may permit an outside device to interact with one or more of the routing protocol process(es) 1030, the label-based forwarding protocol process(es) 1040, the interface process(es) 1050, and the chassis process(es) 1070, via SNMP 1085, and such processes may send information to an outside device via SNMP 1085. Example embodiments consistent with the present description may be implemented in the border gateway protocol ("BGP") process 1035.

The packet forwarding component 1090 may include a microkernel 1092, interface process(es) 1093, distributed ASICs 1094, chassis process(es) 1095 and forwarding (e.g., route-based and/or label-based) table(s) 1096.

Figure 10:
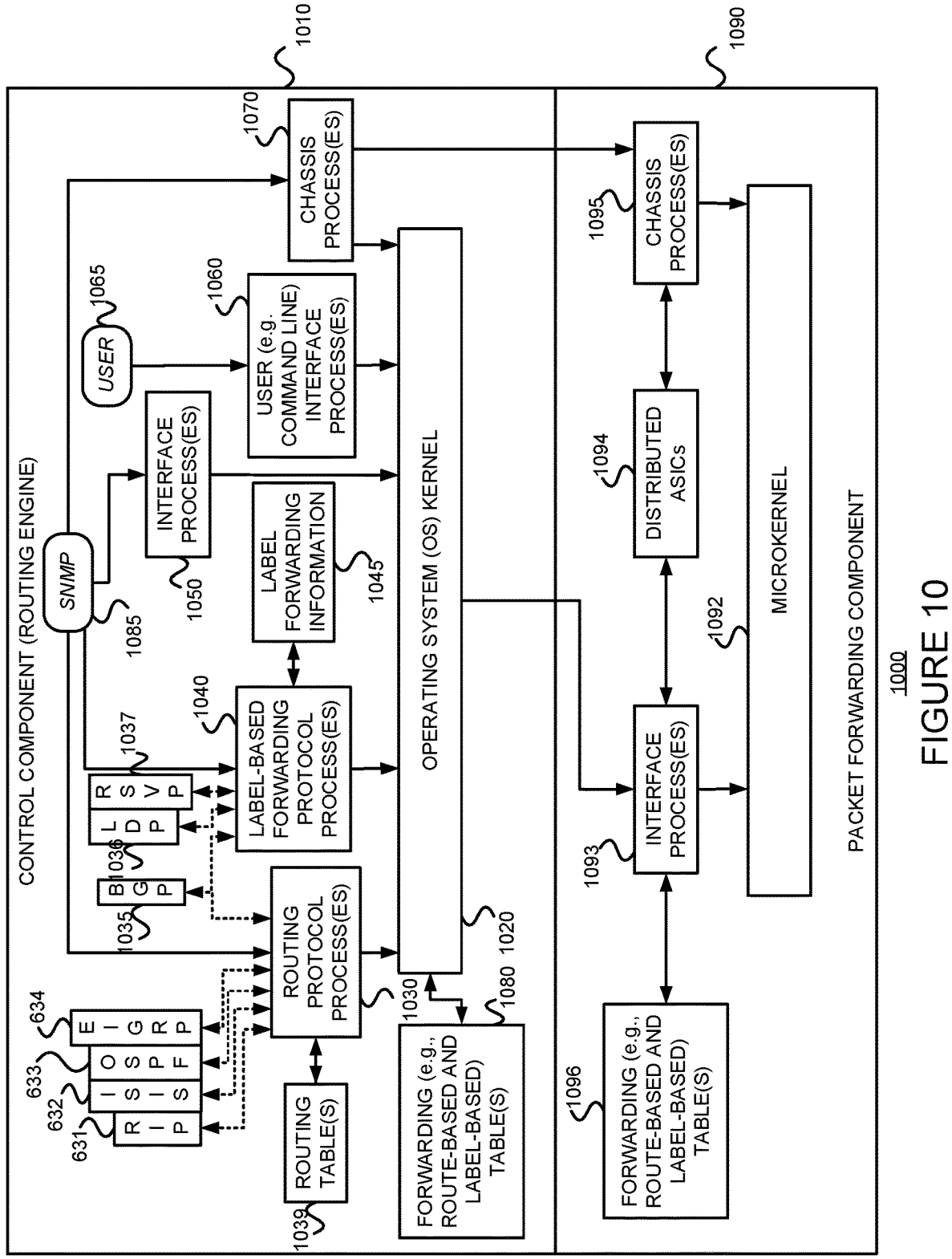
FIG. 10 is a block diagram of a router which may be used as RR or a RR-client.

In the example router 1000 of FIG. 10, the control component 1010 handles tasks such as performing routing protocols, performing label-based forwarding protocols, control packet processing, etc., which frees the packet forwarding component 1090 to forward received packets quickly. That is, received control packets (e.g., routing protocol packets and/or label-based forwarding protocol packets) are not fully processed on the packet forwarding component 1090 itself, but are passed to the control component 1010, thereby reducing the amount of work that the packet forwarding component 1090 has to do and freeing it to process packets to be forwarded efficiently. Thus, the control component 1010 is primarily responsible for running routing protocols and/or label-based forwarding protocols, maintaining the routing tables and/or label forwarding information, sending forwarding table updates to the packet forwarding component 1090, and performing system management. The example control component 1010 may handle routing protocol packets, provide a management interface, provide configuration management, perform accounting, and provide alarms. The processes 1030, 1040, 1050, 1060 and 1070 may be modular, and may interact with the OS kernel 1020. That is, nearly all of the processes communicate directly with the OS kernel 1020. Using modular software that cleanly separates processes from each other isolates problems of a given process so that such problems do not impact other processes that may be running. Additionally, using modular software facilitates easier scaling.

Still referring to FIG. 10, the example OS kernel 1020 may incorporate an application programming interface ("API") system for external program calls and scripting capabilities. The control component 1010 may be based on an Intel PCI platform running the OS from flash memory, with an alternate copy stored on the router's hard disk. The OS kernel 1020 is layered on the Intel PCI platform and establishes communication between the Intel PCI platform and processes of the control component 1010. The OS kernel 1020 also ensures that the forwarding tables 1096 in use by the packet forwarding component 1090 are in sync with those 1080 in the control component 1010. Thus, in addition to providing the underlying infrastructure to control component 1010 software processes, the OS kernel 1020 also provides a link between the control component 1010 and the packet forwarding component 1090.

Referring to the routing protocol process(es) 1030 of FIG. 10, this process(es) 1030 provides routing and routing control functions within the platform. In this example, the RIP 1031, ISIS 1032, OSPF 1033 and EIGRP 1034 (and BGP 1035) protocols are provided. Naturally, other routing protocols may be provided in addition, or alternatively. Similarly, the label-based forwarding protocol process(es) 1040 provides label forwarding and label control functions. In this example, the LDP 1036 and RSVP 1037 (and BGP 1035) protocols are provided. Naturally, other label-based forwarding protocols (e.g., MPLS) may be provided in addition, or alternatively. In the example router 1000, the routing table(s) 1039 is produced by the routing protocol process(es) 1030, while the label forwarding information 1045 is produced by the label-based forwarding protocol process(es) 1040.

Still referring to FIG. 10, the interface process(es) 1050 performs configuration of the physical interfaces (Recall, e.g., 916 and 926 of FIG. 9.) and encapsulation.

The example control component 1010 may provide several ways to manage the router. For example, it 1010 may provide a user interface process(es) 1060 which allows a system operator 1065 to interact with the system through configuration, modifications, and monitoring. The SNMP 1085 allows SNMP-capable systems to communicate with the router platform. This also allows the platform to provide necessary SNMP information to external agents. For example, the SNMP 1085 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 1010, thereby avoiding slowing traffic forwarding by the packet forwarding component 1090.

Although not shown, the example router 1000 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 1060 via a console port, an auxiliary port, and/or a management Ethernet port The packet forwarding component 1090 is responsible for properly outputting received packets as quickly as possible. If there is no entry in the forwarding table for a given destination or a given label and the packet forwarding component 1090 cannot perform forwarding by itself, it 1090 may send the packets bound for that unknown destination off to the control component 1010 for processing. The example packet forwarding component 1090 is designed to perform Layer 2 and Layer 3 switching, route lookups, and rapid packet forwarding.

As shown in FIG. 10, the example packet forwarding component 1090 has an embedded microkernel 1092, interface process(es) 1093, distributed ASICs 1094, and chassis process(es) 1095, and stores a forwarding (e.g., route-based and/or label-based) table(s) 1096. The microkernel 1092 interacts with the interface process(es) 1093 and the chassis process(es) 1095 to monitor and control these functions. The interface process(es) 1092 has direct communication with the OS kernel 1020 of the control component 1010. This communication includes forwarding exception packets and control packets to the control component 1010, receiving packets to be forwarded, receiving forwarding table updates, providing information about the health of the packet forwarding component 1090 to the control component 1010, and permitting configuration of the interfaces from the user interface (e.g., CLI) process(es) 1060 of the control component 1010. The stored forwarding table(s) 1096 is static until a new one is received from the control component 1010. The interface process(es) 1093 uses the forwarding table(s) 1096 to look up next-hop information. The interface process(es) 1093 also has direct communication with the distributed ASICs 1094. Finally, the chassis process(es) 1095 may communicate directly with the microkernel 1092 and with the distributed ASICs 1094.

In the example router 1000, the example methods 700 and 800 may be implemented in the packet control component 1010, and in particular, on the BGP process 1035.

Figure 11:
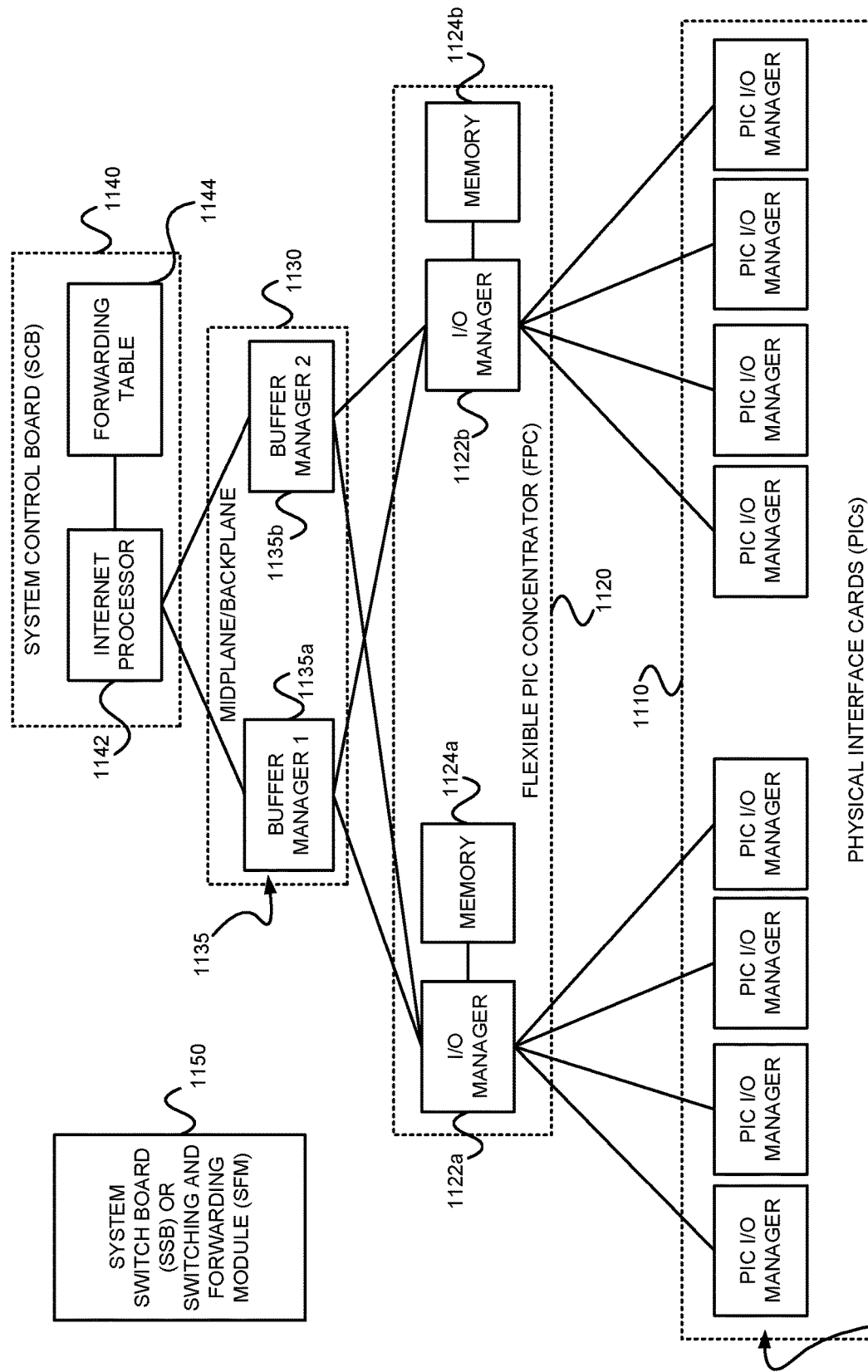
FIG. 11 is an example architecture in which ASICS may be distributed in a packet forwarding component to divide the responsibility of packet forwarding.

Referring back to distributed ASICS 1094 of FIG. 10, FIG. 11 is an example of how the ASICS may be distributed in the packet forwarding component 1090 to divide the responsibility of packet forwarding. As shown in FIG. 11, the ASICs of the packet forwarding component 1090 may be distributed on physical interface cards ("PICs") 1110, flexible PIC concentrators ("FPCs") 1120, a midplane or backplane 1130, and a system control board(s) 1140 (for switching and/or forwarding). Switching fabric is also shown as a system switch board ("SSB"), or a switching and forwarding module ("SFM") 1150. Each of the PICs 1110 includes one or more PIC I/O managers 1115. Each of the FPCs 1120 includes one or more I/O managers 1122, each with an associated memory 1124. The midplane/backplane 1130 includes buffer managers 1135a, 1135b. Finally, the system control board 1140 includes an internet processor 1142 and an instance of the forwarding table 1144 (Recall, e.g., 1096 of FIG. 10).

Still referring to FIG. 11, the PICs 1110 contain the interface ports. Each PIC 1110 may be plugged into an FPC 1120. Each individual PIC 1110 may contain an ASIC that handles media-specific functions, such as framing or encapsulation. Some example PICs 1110 provide SDH/SONET, ATM, Gigabit Ethernet, Fast Ethernet, and/or DS3/E3 interface ports.

An FPC 1120 can contain from one or more PICs 1110, and may carry the signals from the PICs 1110 to the midplane/backplane 1130 as shown in FIG. 11.

The midplane/backplane 1130 holds the line cards. The line cards may connect into the midplane/backplane 1130 when inserted into the example router's chassis from the front. The control component (e.g., routing engine) 1010 may plug into the rear of the midplane/backplane 1130 from the rear of the chassis. The midplane/backplane 1130 may carry electrical (or optical) signals and power to each line card and to the control component 1010.

The system control board 1140 may perform forwarding lookup. It 1140 may also communicate errors to the routing engine. Further, it 1140 may also monitor the condition of the router based on information it receives from sensors. If an abnormal condition is detected, the system control board 1140 may immediately notify the control component 1010.

Referring to FIGS. 11, 12A and 12B, in some exemplary routers, each of the PICs 1110, 1010' contains at least one I/O manager ASIC 1115 responsible for media-specific tasks, such as encapsulation. The packets pass through these I/O ASICs on their way into and out of the router. The I/O manager ASIC 1115 on the PIC 1110, 1010' is responsible for managing the connection to the I/O manager ASIC 1122 on the FPC 1120, 1020', managing link-layer framing and creating the bit stream, performing cyclical redundancy checks (CRCs), and detecting link-layer errors and generating alarms, when appropriate. The FPC 1120 includes another I/O manager ASIC 1122. This ASIC 1122 takes the packets from the PICs 1110 and breaks them into (e.g., 74-byte) memory blocks. This FPC I/O manager ASIC 1122 sends the blocks to a first distributed buffer manager (DBM) 1135a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 1135a' manages and writes packets to the shared memory 1124 across all FPCs 1120. In parallel, the first DBM ASIC 1135a' also extracts information on the destination of the packet and passes this forwarding-related information to the Internet processor 1142/1042'. The Internet processor 1142/1042' performs the route lookup using the forwarding table 1144 and sends the information over to a second DBM ASIC 1135b'. The Internet processor ASIC 1142/1042' also collects exception packets (i.e., those without a forwarding table entry) and sends them to the control component 1010. The second DBM ASIC 1135b' then takes this information and the 74-byte blocks and forwards them to the I/O manager ASIC 1122 of the egress FPC 1120/1020' (or multiple egress FPCs, in the case of multicast) for reassembly. (Thus, the DBM ASICs 1135a' and 1135b' are responsible for managing the packet memory 1124 distributed across all FPCs 1120/1020', extracting forwarding-related information from packets, and instructing the FPC where to forward packets.)

The I/O manager ASIC 1122 on the egress FPC 1120/1020' may perform some value-added services. In addition to incrementing time to live ("TTL") values and re-encapsulating the packet for handling by the PIC 1110, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1122 on the egress FPC 1120/1020' may be responsible for receiving the blocks from the second DBM ASIC 1135b', incrementing TTL values, queuing a pointer to the packet, if necessary, before applying CoS rules, re-encapsulating the blocks, and sending the encapsulated packets to the PIC I/O manager ASIC 1115.

Figure 13:
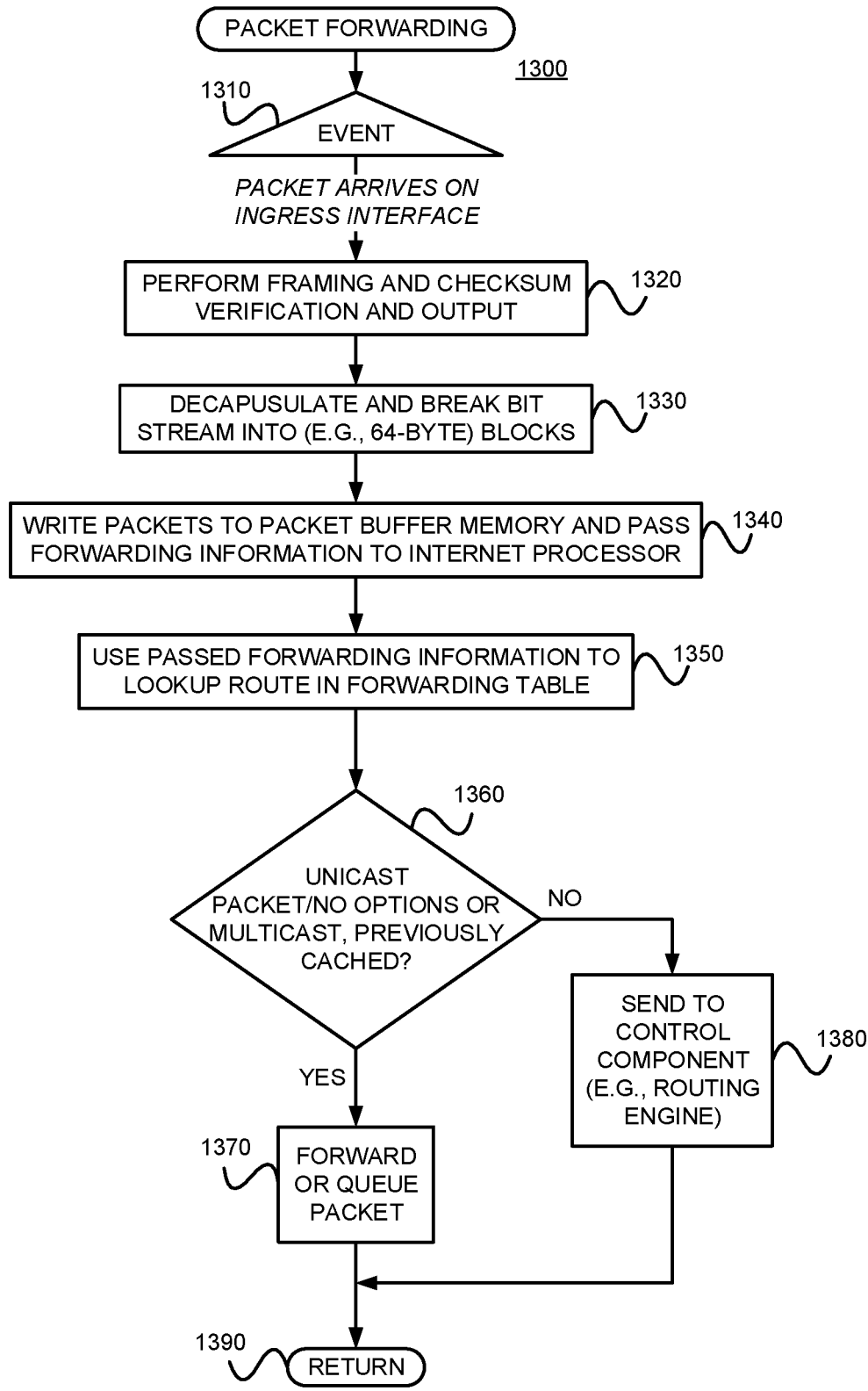
FIG. 13 is a flow diagram of an example method for providing packet forwarding in an example router.

FIG. 13 is a flow diagram of an example method 1300 for providing packet forwarding in the example router. The main acts of the method 1300 are triggered when a packet is received on an ingress (incoming) port or interface. (Event 1310) The types of checksum and frame checks that are required by the type of medium it serves are performed and the packet is output, as a serial bit stream. (Block 1320) The packet is then decapsulated and parsed into (e.g., 64-byte) blocks. (Block 1330) The packets are written to buffer memory and the forwarding information is passed on the Internet processor. (Block 1340) The passed forwarding information is then used to lookup a route in the forwarding table. (Block 1350) Note that the forwarding table can typically handle unicast packets that do not have options (e.g., accounting) set, and multicast packets for which it already has a cached entry. Thus, if it is determined that these conditions are met (YES branch of Decision 1360), the packet forwarding component finds the next hop and egress interface, and the packet is forwarded (or queued for forwarding) to the next hop via the egress interface (Block 1370) before the method 1300 is left (Node 1390) Otherwise, if these conditions are not met (NO branch of Decision 1360), the forwarding information is sent to the control component 1010 for advanced forwarding resolution (Block 1380) before the method 1300 is left (Node 1390).

Referring back to block 1370, the packet may be queued. Actually, as stated earlier with reference to FIG. 11, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1122 may send a request for the packet to the second DBM ASIC 1135b. The DBM ASIC 1135 reads the blocks from shared memory and sends them to the I/O manager ASIC 1122 on the FPC 1120, which then serializes the bits and sends them to the media-specific ASIC of the egress interface. The I/O manager ASIC 1115 on the egress PIC 1110 may apply the physical-layer framing, perform the CRC, and send the bit stream out over the link.

Referring back to block 1380 of FIG. 13, as well as FIG. 11, regarding the transfer of control and exception packets, the system control board 1140 handles nearly all exception packets. For example, the system control board 1140 may pass exception packets to the control component 1010.

Although example embodiments consistent with the present invention may be implemented on the example routers of FIG. 9 or 10, embodiments consistent with the present invention may be implemented on communications network nodes (e.g., routers, switches, etc.) having different architectures. More generally, embodiments consistent with the present invention may be implemented on an example system 1400 as illustrated on FIG. 14.

Figure 14:
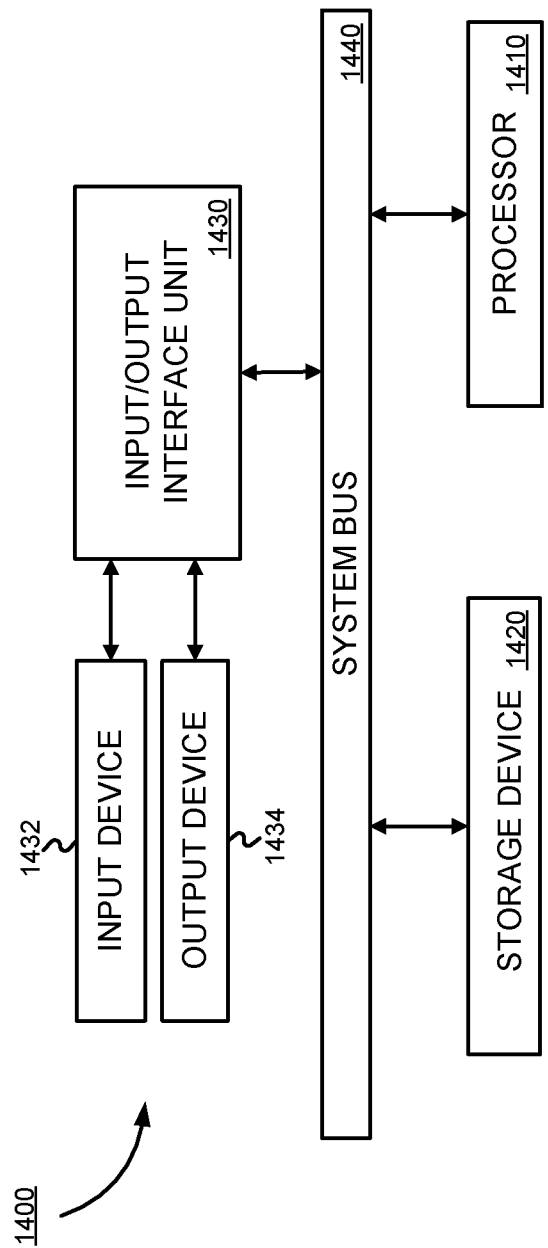
FIG. 14 is a block diagram of an exemplary machine 1400 that may perform one or more of the processes described, and/or store information used and/or generated by such processes.

FIG. 14 is a block diagram of an exemplary machine 1400 that may perform one or more of the processes described, and/or store information used and/or generated by such processes. The exemplary machine 1400 includes one or more processors 1410, one or more input/output interface units 1430, one or more storage devices 1420, and one or more system buses and/or networks 1440 for facilitating the communication of information among the coupled elements. One or more input devices 1432 and one or more output devices 1434 may be coupled with the one or more input/output interfaces 1430. The one or more processors 1410 may execute machine-executable instructions (e.g., C or C++ running on the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1420 and/or may be received from an external source via one or more input interface units 1430. The machine executable instructions may be stored as various software modules, each module performing one or more operations. Functional software modules are examples of components of the invention.

In some embodiments consistent with the present invention, the processors 1410 may be one or more microprocessors and/or ASICs. The bus 1440 may include a system bus. The storage devices 1420 may include system memory, such as read only memory (ROM) and/or random access memory (RAM). The storage devices 1420 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present invention (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, a virtual routing engine, or any device that has computing and networking capabilities.

§ 4.4 Example of Operation of Example Method

Referring back to FIG. 5, when a BGP UPDATE is received from the PE (R1) router to the Route-Reflector (RRR1), the following steps occur when a cut-through processing knob (See § 4.5.1 below.) is configured on RRR1 and a peer/client of RRR1 is capable of cut-through processing:

1. RRR1 will modify the BGP UPDATE by adding the ORIGINATOR_ID with the router-id of the originator (R1) if it is not already present in the UPDATE and add RRR1's cluster-id to the CLUSTER_LIST (Recall, e.g., 750 of FIG. 7.)
2. RRR1 sends the BGP UPDATE, a copy per peer, to all the BGP neighbors that are capable of cut-through processing (RR-Clients and other RRs/Peers) (Recall, e.g., 760 of FIG. 7.)
3. If the router receiving the UPDATE from RRR1 is another RR (say CRR1), it will only update the CLUSTER_LIST; the receiving RR will see the ORIGINATOR_ID field is already present and will not change it.
4. When this cut-through UPDATE is received by a PE/RR-client from RR with the ORIGINATOR_ID, it should process the UPDATE by taking the combination of ORIGINATOR_ID and PATH_ID into account (or taking into account some other combination of field(s) that would avoid conflicting path identifiers from different originators). (Recall, e.g., 840 of FIG. 8.) This will be like processing the UPDATE as if it was received directly from the original advertising router. (See, e.g., § 4.5.3 below.)
5. Once RR completes the cut-through reflection of UPDATE messages, it will start to process the received UPDATE as it is done in current BGP implementation. (Recall 770 of FIG. 7.) This will help in providing BGP UPDATE messages to new sessions that are established towards the RR or to provide BGP UPDATE messages during route-refresh or providing them to peers that don't support cut-through processing.

§ 4.5 Refinements, Alternatives and Extensions

Note that although the BGP UPDATE message format was described with reference to RFC 4271, example embodiments consistent with the present description may be used with any type of BGP UPDATE message, such as the one described in "Multiprotocol Extensions for BGP-4," *Request for Comments* 4760 (*Internet Engineering Task Force*, January 2007 (referred to as "RFC 4760" and incorporated herein by reference), which uses a different NLRI encoding.

§ 4.5.1 Cut-Through Configuration on Rr

Referring back to block 710 of FIG. 7, in some example embodiments consistent with the present description, the RR may be configured with a knob to enable cut-through processing of BGP UPDATE messages. This can be done globally or on a per group basis. The following example configuration commands may be used for global and per group configuration, respectively:
1. set protocols bgp cluster-id<cluster-id> fast-processing; and
2. set protocols bgp group <group-name> cluster-id<cluster-id> fast-processing

§ 4.5.2 Cut-Through Capability Announcement

Referring back to block 720 of FIG. 7, in some example embodiments consistent with the present description, a new BGP capability can be introduced using the techniques described in "Capabilities Advertisement with BGP-4," *Request for Comments* 5492 (Internet Engineering Task Force, February 2009)(referred to as "RFC 5492" and incorporated herein by reference).) on RR-clients (and/or BGP peers) to announce the support of processing of BGP UPDATES that are not processed by RR (or, more specifically, processed as in blocks 750, 760 and 770 of FIG. 7) (referred to as "cut-through processing"). The new capability is exchanged via BGP OPEN message during establishment of the BGP session.

Advertising one's cut-through processing capability is used to accommodate enhancements discussed in § 4.5.3 below.

§ 4.5.3 Accommodating Bgp Add-Path

When a cut-through UPDATE (Recall revised BGP UPDATE message in block 750 of FIG. 7.) is received by a RR-client (e.g., a PE) from the RR, the RR-client should process the revised BGP UPDATE message by taking a combination of ORIGINATOR_ID and PATH_ID into account to avoid implicitly withdrawn routes in the event of false conflicts. Considering a combination of ORIGINATOR_ID and PATH_ID from the BGP UPDATE message will be as if the BGP UPDATE message was received directly from the original advertising router. Otherwise, enhancements done in the document "Advertisement of Multiple Paths in BGP," Request For Comments 7911 (Internet Engineering Task Force, July 2016)(referred to as "RFC 7911" or "BGP add-path" and incorporated herein by reference) might cause the RR-client to implicitly withdraw routes that are not in conflict. This potential problem is illustrated by the following scenario:

RR receives 10/8 path ID 1 from peer A (Call this "route 1.")

RR receives 10/8 path ID 2 from peer A (Call this "route 2.")

RR receives 10/8 path ID 1 from peer B (Call this "route 3.")

RR wishes to reflect all three routes to peer C. When RR performs cut-through processing of the received UPDATES, it reflects each UPDATE to peer C. In the UPDATES received by peer C, the PATH IDs are preserved as they were received by the RR. If peer C were to only consider the PATH ID in the UPDATES, route 1 and route 3 will conflict. Assuming that the UPDATES are reflected by the RR in the order shown above, peer C will consider route 3 to implicitly withdraw route 1 since they have conflicting path IDs. Conventional BGP UPDATE message processing avoids such conflicts by generating path IDs on a hop-by-hop basis. Consequently, if the BGP UPDATE message were to be reflected by the RR in a conventional manner (as opposed to with cut-through processing), no conflicting IDs would be sent by the RR.

By considering a combination of PATH ID and ORIGINATOR ID, the router receiving the reflected route from the RR (peer C in above example), each UPDATE listed above is considered to be unique (even if they have the same PATH ID) because the combination of <path id, originator-id> of each route update is unique.

§ 4.5.3.1 Route Update Information (e.g., Withdrawn Routes) Lacking an ORIGINATOR_ID Although the foregoing technique of using the ORIGINATOR_ID to provide global uniqueness to the PATH_ID works for BGP UPDATE messages that advertise feasible routes, BGP UPDATE messages with withdrawn routes raise further challenges. For example, A BGP UPDATE message that carries only withdrawn routes (referred to as a "withdraw update") is not required to carry path attributes at all, and consequently, in normal protocol operation, can't be expected to carry an ORIGINATOR_ID.

In the case of an UPDATE message that carries both (1) feasible routes (Recall, e.g., 170 of FIG. 1.) and (2) withdrawn routes (Recall, e.g., 140 of FIG. 1.) (referred to as a "mixed update"), the protocol specification (e.g., per RFC 4271 and 4456) doesn't require that the ORIGINATOR_ID, carried in the path attributes portion (Recall, e.g., 160 of FIG. 1.) of the UPDATE message, have any relationship to the withdrawn routes section. Rather, the ORIGINATOR_ID only need be related to the feasible routes.

However, although the protocol (e.g., per RFC 4271 and 4456) doesn't require that the ORIGINATOR_ID be included in a withdraw UPDATE message, it doesn't forbid the ORIGINATOR_ID from being included in a withdraw UPDATE message. Therefore, in some example embodiments consistent with the present description, a withdraw UPDATE message will always include an ORIGINATOR_ID that is used to provide PATH_ID context (for purposes of a unique ORIGINATOR_ID, PATH_ID combination.

Including an ORIGINATOR_ID in a withdraw UPDATE message limits how efficiently a withdraw UPDATE message can be packed, as compared with the conventional case, though this should not be an issue in many important use cases. Consider the following example. Assume RR has sessions with peers A, B, and C. Peer A sends route Ra, peer B sends route Rb, and RR reflects the UPDATE messages including Ra and Rb to peer C. Assume further that later (for some reason), RR simultaneously loses its sessions with peers A and B. In normal operation of the protocol (e.g., per RFC 4271 and 4760), the RR could send a single withdraw UPDATE message listing both Ra and Rb. With the foregoing proposal, however, RR must send one withdraw UPDATE message with ORIGINATOR_ID of A, listing Ra, and another withdraw UPDATE message with ORIGINATOR_ID of B, listing Rb. In an extreme case, one withdraw UPDATE message listing many hundreds or even thousands of withdrawn routes from many origins in the conventional case could become hundreds or even thousands of individual withdraw UPDATE message, so this can be a drawback. However, in certain use cases, such as a massive datacenter type deployment), a scenario in which sessions between the PEs and the RR fail is relatively inconsequential because there is assumed to be an alternative way (say, an interior gateway protocol (IGP)) for other PEs to determine if PEs A and B have failed. If PEs A and B have failed, this will be discovered by the IGP and their routes will be taken out of service even before the withdraw UPDATE messages are received. Since the withdraw messages are effectively redundant, it may be acceptable if they are not efficient. If the PEs haven't failed, but only their sessions to the RR have failed, this should not be an issue because there's a good chance routes Ra and Rb are actually still feasible even though RR no longer has a session to prove it. (Only in the case in which (1) the sessions to A and B fail, and (2) Ra and Rb have failed too, and (3) routers A and B themselves have not failed, is there a problem, though the protocol will still converge.) One of more of the foregoing factors may be used to help determine if and when (perhaps on a dynamic basis) to apply the proposed processing.

The foregoing addresses withdraw UPDATE messages. Recall that there is also the case of a mixed UPDATE (that both announces feasible routes and withdraws other routes). In this case, the ORIGINATOR_ID which applies to the new routes will apply to the withdrawn route as well, though, as was the case with withdraw UPDATE messages, unrelated routes (i.e., those with different ORIGINATOR_IDs) can't be packed in the same mixed UPDATE message.

An alternative approach to address this challenge would be to introduce a variant add-path encoding, with a 64 bit wide PATH_ID, that physically concatenates the global ORIGINATOR_ID and local PATH_ID fields for each route, instead of only logically concatenating them as described so far. This alternative solution would not suffer from the foregoing issues, though it would add storage and communication overhead (since each route now occupies an extra 32 bits in memory and in the transmitted message).

§ 4.5.3.2 Almost Stateless Generation of PATH_IDs

In certain cases, if PATH_IDs must be generated locally, some example embodiments consistent with the present description may do so efficiently and (almost) statelessly. More specifically, if the RR knows that all received PATH_IDs only use the bottom 16 bits (This can be easily checked on receipt. Indeed the Junos operating system used in some routers from Juniper Networks of Sunnyvale, Calif. only uses the bottom 16 bits of PATH_IDs.), and if the universe of ORIGINATOR_IDs can be mapped into another 16 bits (for example, using a hash), the mapped ORIGINATOR_ID can simply be put into the unused top 16 bits of PATH_ID and the route can then be sent out. If we can make the PATH_ID globally unique in this way, cut-through processing of BGP UPDATE message can be performed even for routes reflected towards noncompliant peers (because the PATH_ID mapping should be something that can be done with only a small amount of processing using only thread-local data, akin to the amount of processing needed to do ORIGINATOR_ID and CLUSTER_LIST processing.) However, this technique cannot be used if a route uses more than 16 bits of PATH_ID; in such cases, a new locally-unique PATH_ID is computed for each route placed into the Adj-RIB-Out. The algorithm for computing the PATH_ID is a local matter, and any 32-bit integer may be used as long as it satisfies the local uniqueness requirement.

Figure 4:
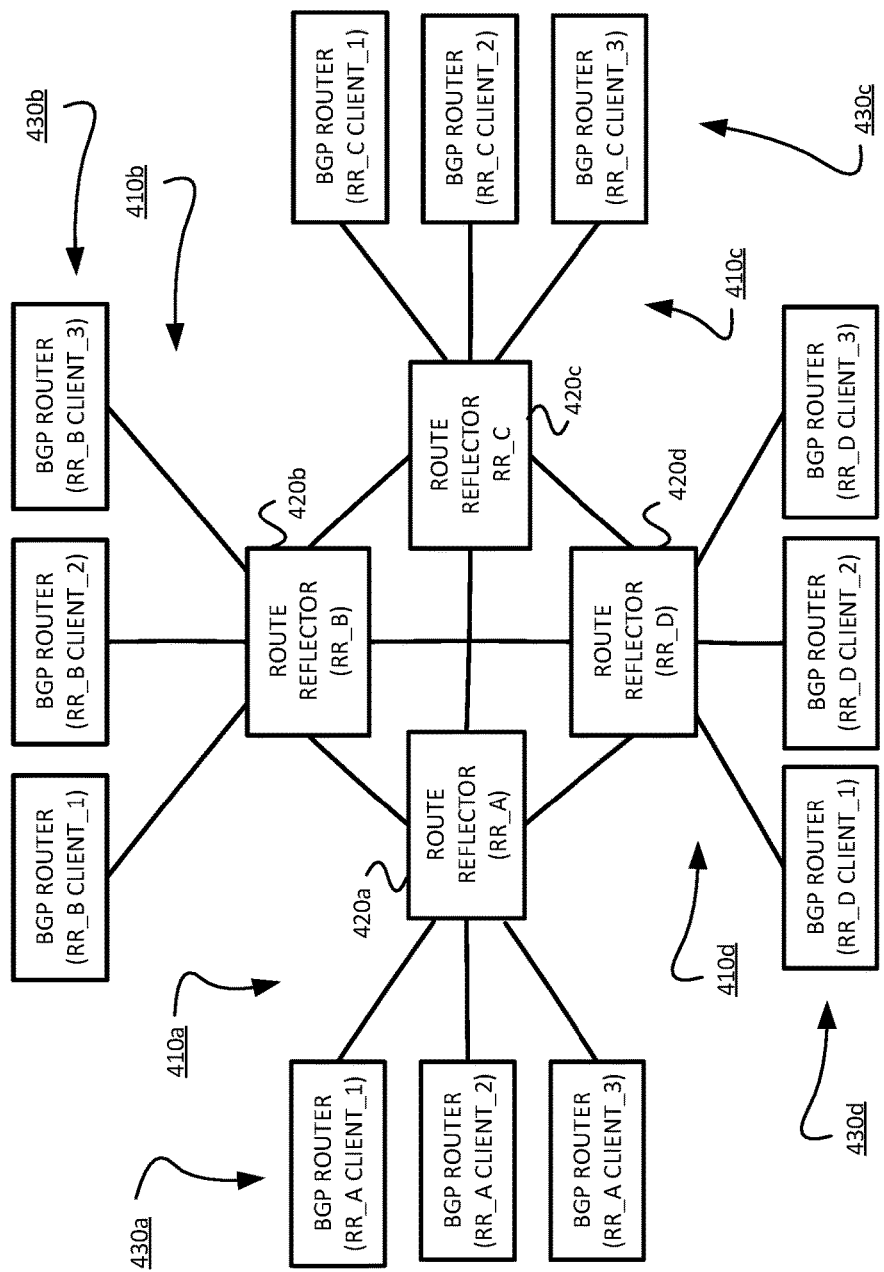
FIG. 4 illustrates an example environment including multiple clusters linked to one another by configuring a full mesh of route reflectors (RRs).
Figure 5:
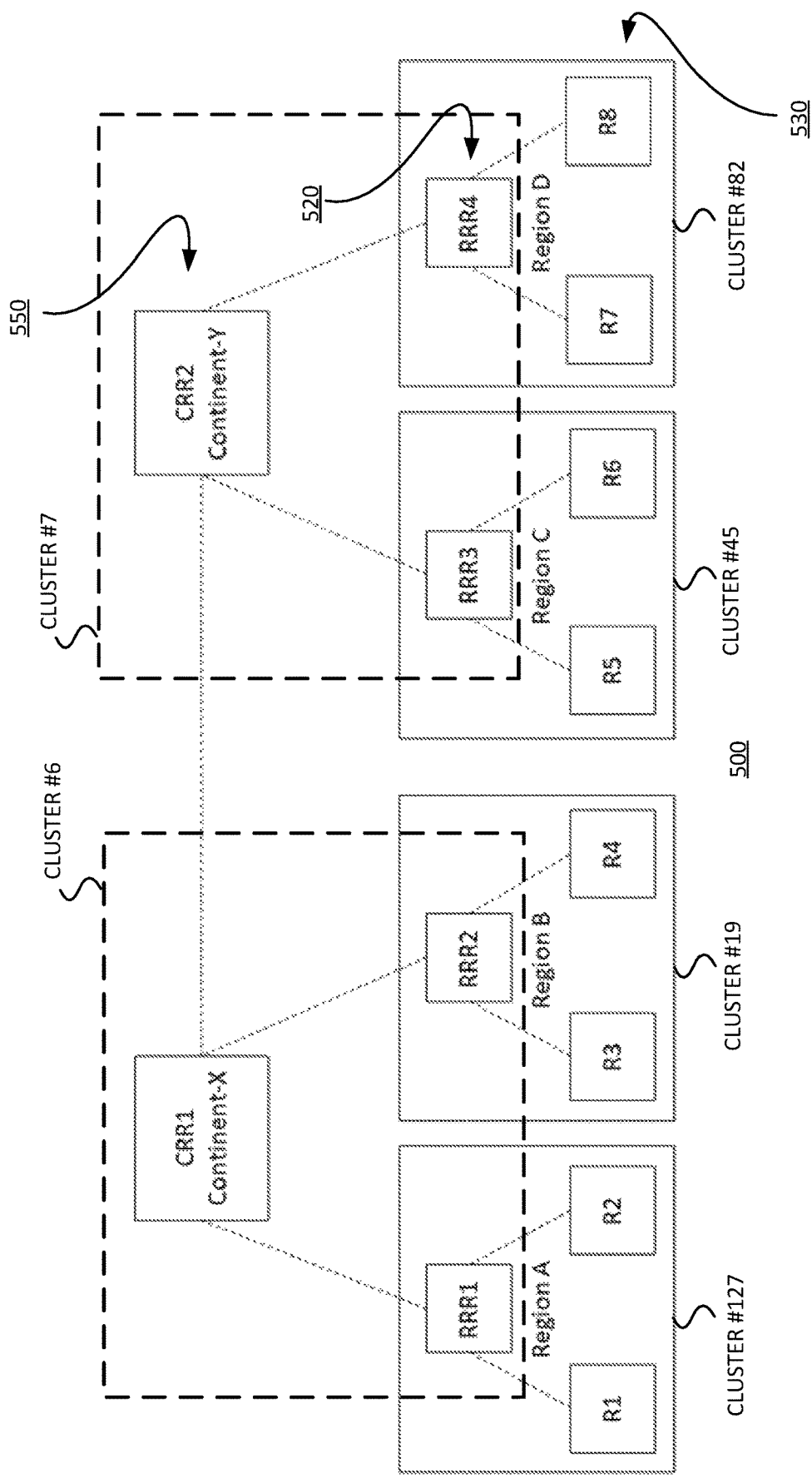
FIG. 5 illustrates an example environment including a hierarchical arrangement of route reflectors (RRs).
Figure 6:
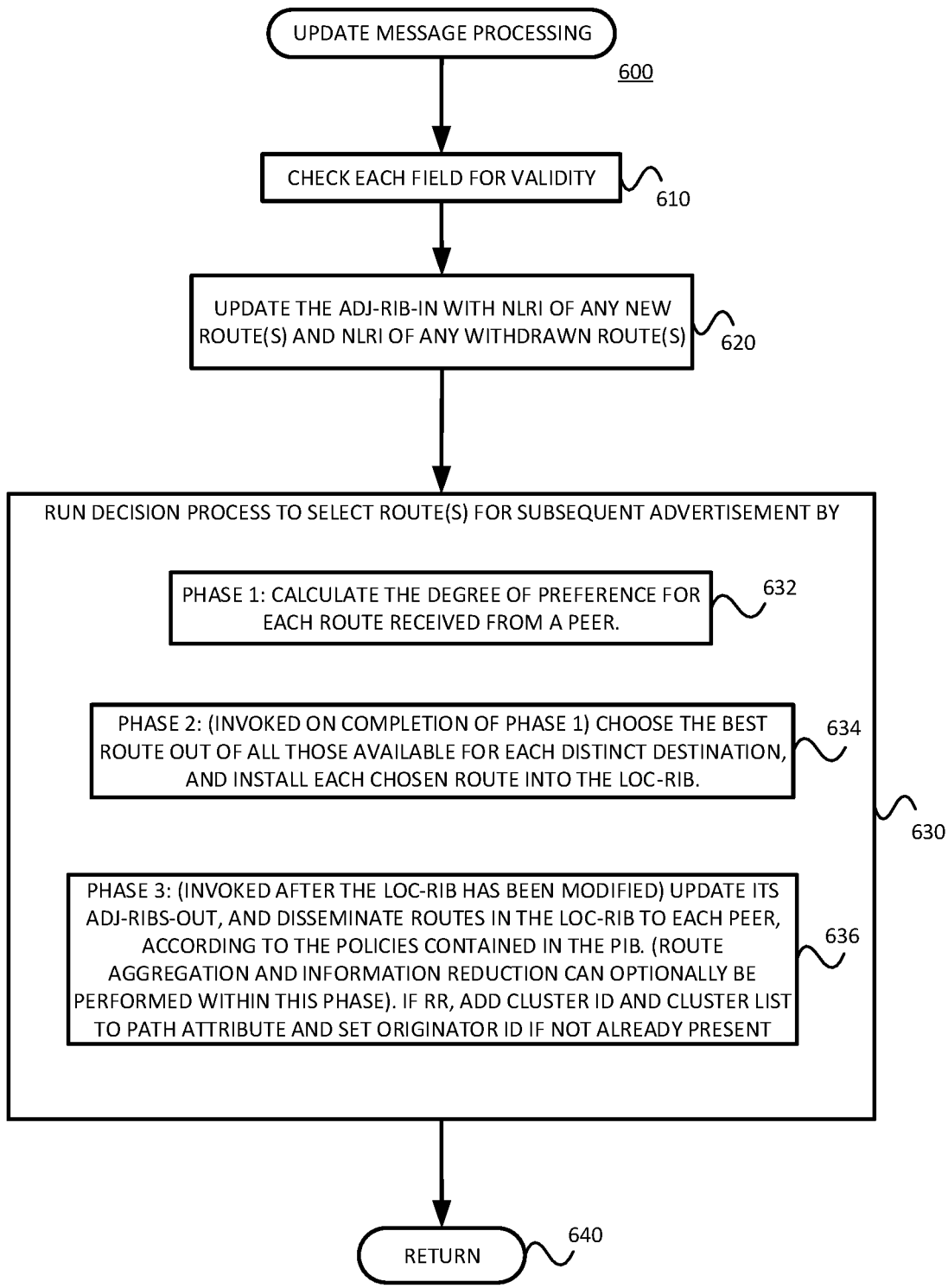
FIG. 6 is a flow diagram of an example method 600 for processing a BGP UPDATE message in a manner consistent with RFC 4271.

§ 4.5.3.2.1 Handling Noncompliant PEs—at Egress from Route Reflection Mesh, or at Ingress to Route Reflection Mesh In at least some example embodiments consistent with the present description, the risk of encountering PATH_IDs that use the top 16 bits can be eliminated (or at least mitigated), by performing exception handling at ingress to the reflection fabric (Note that interconnected RRs such as RR_A, RR_B, RR_C and RR_D in FIG. 4, or the RRRs and CRRs in cluster #6 of FIG. 5, define a "reflection fabric") instead of at egress. That is, any peer that sends PATH_IDs greater than 16 bits can be treated as noncompliant (i.e., without cut-through processing capability), in which case, their UPDATES would be subjected to standard/conventional BGP processing when received by the ingress RR of the reflection fabric. In effect, the first RR would act as a proxy, remapping the PATH_ID into the bottom 16 bits, in which case the technique described in § 5.4.3.2 above could be used.

§ 4.5.4 Transitioning Between Cut-Through and Standard Processing if a RR-Peer Consumes Routes Too Slowly Since some RR-client(s) (and even some RRs for that matter) might not support the cut-through processing capability, the BGP implementation must be able to move back and forth between cut-through processing operations (Recall, e.g., 750, 760 and 770 of FIG. 7.) and normal/conventional operations (Recall, e.g., 790 of FIG. 7.) to enable state convergence (e.g., initial convergence). Moving back and forth between cut-through processing operations and normal/convention operations may also become necessary when a peer can't consume reflected UPDATE messages fast enough. In such a case, a RR might buffer UPDATE messages on behalf of the peer for some time. However, buffer space could become exhausted, requiring a different strategy.

Alternative solutions to this challenge include: (a) having the RR stop accepting new incoming UPDATES until its peer has consumed enough outgoing (reflected) UPDATES to free buffer space, (b) having the RR drop the BGP session with the peer, and (c) transitioning the peer to "normal BGP" mode. (Recall, e.g., block 790 of FIG. 7.) Of these possible alternatives, having the RR stop accepting new incoming UPDATES until its peer has consumed enough outgoing (reflected) UPDATES to free buffer space seems to be undesirable since it pushes the problem upstream in the network. (But see § 4.5.4.1 below.) Further having the RR drop the BGP session with the peer is clearly undesirable. Thus, an example embodiment in which the peer is transitioned to "normal BGP" mode when its buffer becomes too full (or is otherwise predicted to overflow) may be preferred. Before this alternative solution is further described, some background is provided.

Normal or conventional BGP processing of UPDATE messages, though slower, can scale better than cut-through processing in certain situations. Consider, for example, a RR that receives the following sequence of UPDATE messages from peer A:
Announce 10/8
Withdraw 10/8
Announce 10/8
Withdraw 10/8
Announce 10/8
Withdraw 10/8
Announce 10/8
Withdraw 10/8
Announce 10/8
Withdraw 10/8
Announce 10/8

This sequence of 11 UPDATE messages causes the route to change back and forth between two states (sometimes referred to as "flapping"). This flipping back and forth (or even among more than two routes) can repeat even more. Now, suppose RR is reflecting these UPDATE messages to peer C. In accordance with cut-through processing consistent with the present description, if things are going well, each UPDATE message goes out quickly after it comes into the RR. This situation is fine since no bottleneck develops and things are working as desired. But if RR-client (BGP peer) C has stopped consuming UPDATE messages and flow-blocked the session (or under various other conditions, for example if RR is under heavy load and just doesn't have time to send out the messages), then all 11 UPDATE messages may have to be buffered on RR, waiting to be sent. When all these UPDATES are finally sent, RR-client C has to process all of them, which is a waste of resources since all it really wants is to arrive at the final state (in the 11$^{th}$ UPDATE message); all the intermediate states are stale.

By contrast, normal/conventional BGP is what's called a state-compressing protocol. RR would locally store either (10/8 via A) after it processes an announcement, or nothing at all after it processes a withdrawal; either one or no data objects instead of the 11 messages of the above example. So, when the session to RR-client C becomes unblocked, RR would send only a single UPDATE message, based on the current (or most recent) state. So, the RR would reflect only one message, advertising 10/8, and in turn, RR-client C would only have to process a single message, using less CPU and converging with the rest of the network more quickly.

The foregoing example shows that that under various "heavy load" conditions, the dynamics of standard/conventional BGP perform in a manner that conserves CPU, memory and bandwidth. So, under certain "heavy load" conditions, standard/conventional BGP may be preferred over cut-through processing consistent with the present description. However, as noted in the background sections above, standard/conventional BGP can cause undesired (or even unacceptable) latency during periods of light load. So, in summary, in the worst case ("heavy load" conditions), standard/conventional BGP may be better than cut-through processing consistent with the present description, but in the normal or expected case, standard/conventional BGP is worse.

Therefore, if it is assumed that periods of "light load" will dominate periods of "heavy load", it may be acceptable to always use cut-through processing (if the capability exists, and buffering is not expected to overflow). Nonetheless, an example embodiment which can transition, dynamically, between standard/conventional BGP and cut-through processing, may be useful. Such switching may be triggered by any combination of one or more factors including, for example, buffer load, expected buffer overflow, UPDATE load, latency tolerance, CPU load, system memory load, etc. In one example, a switch from cut-through processing to standard/conventional BGP may be triggered as soon as a RR-client (BGP peer) flow-blocks the RR. This problem might be avoided altogether (or at least reduced) by providing a deep buffer.

§ 4.5.4.1 Flow-Blocking Upstream Peers (Under Some Circumstances)

Recall that having the RR stop accepting new incoming UPDATES until its peer has consumed enough outgoing (reflected) UPDATES to free buffer space seems to be undesirable since it pushes the problem upstream in the network. That is, when a downstream peer flow-blocks reflected routes from a RR, the RR could propagate the problem upstream by flow-blocking its own peers. Although it seems that this would be the wrong strategy to pursue if just one RR-client (BGP peer) flow-blocks the RR, if all (or perhaps some high percentage of) RR-clients flow-block reflected routes from the RR, this strategy might become useful.

§ 4.5.5 No Compliant PEs Case

Recall from block 740 of FIG. 7 that it is possible for there to be no RR-clients with cut-through processing capability. (Block 740, NO) Further, referring to FIGS. 4 and 5, even if there are no compliant PEs, there may be compliant RR(s), which are themselves clients of the RR at issue. Recall further from 720 of FIG. 7 that the example method 700 has a PE (RR-client) exchange its cut-through processing capability with an RR in order to indicate whether or not the PE can do the extra processing of the ORIGINATOR_ID. If that capability isn't exchanged, on that session, the RR has to fall back to standard/conventional BGP processing (Recall, e.g., block 790 of FIG. 7.), thereby generating and sending a locally-significant PATH_ID. However, even in an extreme case in which every PE in the entire network does not have cut-through processing capability, if the interior of the RR fabric is large (and may require many hops to traverse it, such as from RRR1 to RRR4 in FIG. 5), example embodiments consistent with the present description still reduce latency from one RR at an ingress edge (in terms of BGP signaling) of a RR cluster to another RR at an egress edge (in terms of BGP signaling) of a RR cluster. When a RR at the edge of a RR cluster reverts to standard/conventional BGP UPDATE message processing, this is no worse than the current status quo. As upgraded Pes capable of cut-through processing are introduced, they benefit from quicker convergence, thereby incentivizing their deployment. Thus, in summary, even if a RR has to reflect UPDATES to a noncompliant (i.e., not capable of cut-through processing) PE(s) in the standard/conventional manner, when a RR receives UPDATE messages from such a noncompliant PE, it can reflect them to other compliant devices (e.g., other compliant RRs) with cut-through processing.

§ 4.6 Conclusions

As should be apparent from the foregoing, example embodiments consistent with the present description will help improve the performance and scalability of route reflection, and will be especially useful to the operators of large networks.

Since both CLUSTER_LIST and ORIGINATOR_ID fields are part of the Path attributes field in BGP UPDATE messages, they are independent of the NLRIs. Therefore, these fields can be modified without reading and/or processing NLRIs.

What is claimed is:

1. A computer-implemented method comprising:
  a) receiving, by a route reflector, a border gateway protocol (BGP) UPDATE message; and
  b) responsive to receiving the BGP UPDATE message,
    1) updating, by the route reflector, a CLUSTER_LIST value and, if needed, an ORIGINATOR_ID value, in a path attribute section in the BGP UPDATE message to generate a revised BGP UPDATE message,
    2) sending, by the route reflector, the revised BGP UPDATE message to a client of the route reflector, regardless of completing or not completing one of
      (A) field validity checking of the BGP UPDATE message,
      (B) Adj-RIBS-In update using the BGP UPDATE message,
      (C) decision processing for route selection using information in the BGP UPDATE message, or
      (D) Adj-RIBS-Out update using the BGP UPDATE message.

2. The computer-implemented method of claim 1 further comprising:
  determining, by the route reflector, that the client of the route reflector is capable of processing the revised BGP UPDATE message, wherein the act of determining was performed before the act of sending.

3. The computer-implemented method of claim 1 further comprising:
  responsive to receiving the BGP UPDATE message, and after sending the revised BGP UPDATE message to a client of the route reflector, further
    3) checking, by the route reflector, validity of fields of the BGP UPDATE message.

4. The computer-implemented method of claim 1 further comprising:
  responsive to receiving the BGP UPDATE message, and after sending the revised BGP UPDATE message to a client of the route reflector, further
    3) updating, by the route reflector, Adj-RIBS-In information, stored on the route reflector, using the BGP UPDATE message.

5. The computer-implemented method of claim 1 further comprising:
  responsive to receiving the BGP UPDATE message, and after sending the revised BGP UPDATE message to a client of the route reflector, further
    3) performing decision processing for route selection, by the route reflector, using information in the BGP UPDATE message.

6. The computer-implemented method of claim 1 further comprising:
  responsive to receiving the BGP UPDATE message, and after sending the revised BGP UPDATE message to a client of the route reflector, further
    3) updating, by the route reflector, Adj-RIBS-Out information, stored on the route reflector, using the BGP UPDATE message.

7. The computer-implemented method of claim 1 wherein the act of sending, by the route reflector, the revised BGP UPDATE message to a client of the route reflector, is performed regardless of starting or not starting one of
  (A) field validity checking of the BGP UPDATE message,
  (B) Adj-RIBS-In update using the BGP UPDATE message,
  (C) decision processing for route selection using information in the BGP UPDATE message, or
  (D) Adj-RIBS-Out update using the BGP UPDATE message.

8. The computer-implemented method of claim 1 further comprising:
  c) receiving, by the client of the route reflector, the revised BGP UPDATE message; and
  d) responsive to receiving the revised BGP UPDATE message,
    1) generating a unique path identifier using information from both (i) a path identifier carried in the revised BGP UPDATE message received, and (ii) the ORIGINATOR_ID value carried in the revised BGP UPDATE message received, and
    2) processing the revised BGP UPDATE message received using the generated unique path identifier.

9. The computer-implemented method of claim 1 wherein the received BGP UPDATE message includes a path ID field including a path ID value and unused bits, and
  wherein the revised BGP UPDATE message includes a path ID field including both (1) bits from a path ID value included in the path ID field of the received BGP UPDATE message, and (2) bits derived from an ORIGINATOR ID value carried in the received BGP UPDATE message.

10. A system comprising:
  a) a route reflector having
    1) at least one processor; and
    2) a non-transitory computer-readable medium storing processor-executable instructions which, when executed by the at least one processor, cause the at least one processor to perform a method including A) receiving, by a route reflector, a border gateway protocol (BGP) UPDATE message; and
B) responsive to receiving the BGP UPDATE message,
  i) updating, by the route reflector, a CLUSTER_LIST value and, if needed, an ORIGINATOR_ID value, in a path attribute section in the BGP UPDATE message to generate a revised BGP UPDATE message,
  ii) sending, by the route reflector, the revised BGP UPDATE message to a client of the route reflector, regardless of completing or not completing one of
    field validity checking of the BGP UPDATE message,
    Adj-RIBS-In update using the BGP UPDATE message,
    decision processing for route selection using information in the BGP UPDATE message, or
    Adj-RIBS-Out update using the BGP UPDATE message.

11. The system of claim 10 wherein the method further includes
determining, by the route reflector, that the client of the route reflector is capable of processing the revised BGP UPDATE message, wherein the act of determining was performed before the act of sending.

12. The system of claim 10 wherein the method further includes
responsive to receiving the BGP UPDATE message, and after sending the revised BGP UPDATE message to a client of the route reflector, further
  iii) checking, by the route reflector, validity of fields of the BGP UPDATE message.

13. The system of claim 10 wherein the method further includes
responsive to receiving the BGP UPDATE message, and after sending the revised BGP UPDATE message to a client of the route reflector, further
  iii) updating, by the route reflector, Adj-RIBS-In information, stored on the route reflector, using the BGP UPDATE message.

14. The system of claim 10 wherein the method further includes
responsive to receiving the BGP UPDATE message, and after sending the revised BGP UPDATE message to a client of the route reflector, further
  iii) performing decision processing for route selection, by the route reflector, using information in the BGP UPDATE message.

15. The system of claim 10 wherein the method further includes
responsive to receiving the BGP UPDATE message, and after sending the revised BGP UPDATE message to a client of the route reflector, further
  iii) updating, by the route reflector, Adj-RIBS-Out information, stored on the route reflector, using the BGP UPDATE message.

16. The system of claim 10 wherein the act of sending, by the route reflector, the revised BGP UPDATE message to a client of the route reflector, is performed regardless of starting or not starting one of
(A) field validity checking of the BGP UPDATE message,
(B) Adj-RIBS-In update using the BGP UPDATE message,
(C) decision processing for route selection using information in the BGP UPDATE message, or
(D) Adj-RIBS-Out update using the BGP UPDATE message.

17. The system of claim 10 further comprising:
b) the client of the route reflector, including
  1) at least one processor, and
  2) a non-transitory computer-readable medium storing processor-executable instructions which, when executed by the at least one processor of the client of the route reflector, cause the at least one processor of the client of the route reflector to perform a method including
    A) receiving the revised BGP UPDATE message; and
    B) responsive to receiving the revised BGP UPDATE message,
      1) generating a unique path identifier using information from both (i) a path identifier carried in the revised BGP UPDATE message received, and (ii) the ORIGINATOR_ID value carried in the revised BGP UPDATE message received, and
      2) processing the revised BGP UPDATE message received using the generated unique path identifier.

18. A non-transitory computer-readable medium storing processor-executable instructions which, when executed by at least one processor, cause the at least one processor to perform a method including
a) receiving, by a route reflector, a border gateway protocol (BGP) UPDATE message; and
b) responsive to receiving the BGP UPDATE message,
  1) updating, by the route reflector, a CLUSTER_LIST value and, if needed, an ORIGINATOR_ID value, in a path attribute section in the BGP UPDATE message to generate a revised BGP UPDATE message,
  2) sending, by the route reflector, the revised BGP UPDATE message to a client of the route reflector, regardless of completing or not completing one of
    field validity checking of the BGP UPDATE message,
    Adj-RIBS-In update using the BGP UPDATE message,
    decision processing for route selection using information in the BGP UPDATE message, or
    Adj-RIBS-Out update using the BGP UPDATE message.

19. The non-transitory computer-readable medium of claim 18 wherein the method further includes
determining, by the route reflector, that the client of the route reflector is capable of processing the revised BGP UPDATE message, wherein the act of determining was performed before the act of sending.

20. The non-transitory computer-readable medium of claim 18 wherein the act of sending, by the route reflector, the revised BGP UPDATE message to a client of the route reflector, is performed regardless of starting or not starting one of
(A) field validity checking of the BGP UPDATE message,
(B) Adj-RIBS-In update using the BGP UPDATE message,
(C) decision processing for route selection using information in the BGP UPDATE message, or
(D) Adj-RIBS-Out update using the BGP UPDATE message.

* * * * *